(12) United States Patent
Gupta et al.

(10) Patent No.: US 12,501,371 B2
(45) Date of Patent: Dec. 16, 2025

(54) METHOD AND ELECTRONIC DEVICE FOR OPTIMIZING POWER CONSUMPTION IN ELECTRONIC DEVICE

(71) Applicant: SAMSUNG ELECTRONICS CO., LTD., Suwon-si (KR)

(72) Inventors: Atul Gupta, Noida (IN); Gaurav Garg, Noida (IN); Utkarsh Pathak, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 334 days.

(21) Appl. No.: 18/319,020

(22) Filed: May 17, 2023

(65) Prior Publication Data

US 2023/0292257 A1 Sep. 14, 2023

Related U.S. Application Data

(63) Continuation of application No. PCT/KR2022/009630, filed on Jul. 5, 2022.

(30) Foreign Application Priority Data

Jul. 5, 2021 (IN) .............................. 202141030181

(51) Int. Cl.
*H04W 52/00* (2009.01)
*H04W 52/02* (2009.01)
(Continued)

(52) U.S. Cl.
CPC ..... *H04W 52/343* (2013.01); *H04W 52/0261* (2013.01); *H04W 52/42* (2013.01)

(58) Field of Classification Search
CPC ........... H04W 52/343; H04W 52/0261; H04W 52/42; H04W 455/411
See application file for complete search history.

(56) References Cited

U.S. PATENT DOCUMENTS 9,538,575 B2   1/2017 Yamada
9,565,467 B2   2/2017 Raveendran
(Continued)

FOREIGN PATENT DOCUMENTS

CN   104869646 A   8/2015
EP   2384061 B1    3/2017
(Continued)

OTHER PUBLICATIONS

International Search Report for PCT/KR2022/009630 mailed Oct. 21, 2022, 3 pages.
(Continued)

*Primary Examiner* — Khai M Nguyen
(74) *Attorney, Agent, or Firm* — NIXON & VANDERHYE P.C.

(57) ABSTRACT

Embodiments herein disclose a method for optimizing power consumption in an electronic device comprising a plurality of RATs. The method includes determining a system bandwidth of the plurality of RATs available in the electronic device and mapping at least one portion of the system bandwidth to at least one power consumption level of a set of power consumption levels of the electronic device. Further, the method includes distributing the at least one portion of the system bandwidth across the plurality of RATs based on the at least one mapped power consumption level of the set of power consumption levels of the electronic device. Further, the method includes enforcing the distributed system bandwidth across the plurality of RATs in the electronic device and enabling at least one application to use the distributed system bandwidth across the plurality of RATs in the electronic device.

18 Claims, 14 Drawing Sheets

(51) Int. Cl.
*H04W 52/34* (2009.01)
*H04W 52/42* (2009.01)

(56) References Cited

U.S. PATENT DOCUMENTS

| | | | |
|---|---|---|---|
| 9,913,216 B1* | 3/2018 | Deshpande | H04W 28/14 |
| 10,482,672 B2 | 11/2019 | Namgoong et al. | |
| 10,492,132 B2 | 11/2019 | Lindoff et al. | |
| 10,785,712 B2 | 9/2020 | Lindoff et al. | |
| 10,904,830 B2 | 1/2021 | Yi et al. | |
| 11,481,014 B2 | 10/2022 | Xu et al. | |
| 11,671,999 B2 | 6/2023 | Egner et al. | |
| 2011/0003609 A1* | 1/2011 | Sundstrom | H04W 52/0206 |
| | | | 455/509 |
| 2014/0192663 A1 | 7/2014 | Rosa et al. | |
| 2015/0098379 A1 | 4/2015 | Lunden et al. | |
| 2016/0007233 A1 | 1/2016 | Rao et al. | |
| 2016/0135144 A1* | 5/2016 | Tsai | H04W 52/0258 |
| | | | 455/553.1 |
| 2017/0244633 A1 | 8/2017 | Krishnan et al. | |
| 2019/0028946 A1 | 1/2019 | Gandhi et al. | |
| 2019/0342836 A1 | 11/2019 | Ang et al. | |
| 2020/0205052 A1 | 6/2020 | Su et al. | |
| 2020/0260375 A1 | 8/2020 | Li et al. | |
| 2020/0314935 A1 | 10/2020 | Otaka et al. | |
| 2020/0374979 A1 | 11/2020 | Rice et al. | |
| 2025/0238071 A1* | 7/2025 | Ahmad | G06F 1/3296 |

FOREIGN PATENT DOCUMENTS

| | | |
|---|---|---|
| EP | 3462788 | 5/2022 |
| WO | 2012149737 A1 | 11/2012 |
| WO | 2016078600 A1 | 5/2016 |

OTHER PUBLICATIONS

Written Opinion of the ISA for PCT/KR2022/009630 mailed Oct. 21, 2022, 5 pages.
Office Action for IN202141030181 dated Feb. 28, 2023, 6 pages.

* cited by examiner

METHOD AND ELECTRONIC DEVICE FOR OPTIMIZING POWER CONSUMPTION IN ELECTRONIC DEVICE

CROSS-REFERENCE TO RELATED APPLICATIONS

This application is a continuation of International Application No. PCT/KR2022/009630 designating the United States, filed on Jul. 5, 2022, in the Korean Intellectual Property Receiving Office and claiming priority to Indian Patent Application No. 202141030181, filed on Jul. 5, 2021, in the Indian Patent Office, the disclosures of which are incorporated by reference herein in their entireties.

BACKGROUND

Field

The disclosure relates to wireless communication, and for example, is related to a method and an electronic device for optimizing power consumption in the electronic device including a plurality of Radio Access Technologies (RATs).

Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The Internet, which is a connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the advancement of RATs, smartphone(s) have become more widely available, and a variety of applications have grown up to attract a large number of user(s). Many existing smartphone(s) support several RATs in one device such as Bluetooth, Wireless Fidelity (Wi-Fi), and Global System for Mobile Communications (GSM), Universal Mobile Telecommunications System (UMTS), Long-Term Evolution (LTE), or 5G New Radio (NR). The RAT has improved data transmission rates over time. For example, in the IEEE 802.11a/b/g/n/ac wireless local area network (WLAN) in the 2.4/5 GHz frequency band, advanced transmission technologies such as high-order modulation transmission methods, low-density parity check, and beamforming have increased channel bandwidth and improved transmission speeds. As a result, RATs have advanced and transmission speeds and service quality of existing smartphone(s) have improved as circuit complexity has risen, causing significant increases in power consumption by the existing smartphone(s). However, advancements in battery technology are moving at a slow pace as compared to increases in power usage/consumption by the existing smartphone(s).

Furthermore, other factors contribute to rapid degradation of a smartphone's battery. For example, larger smartphone screens with support of high-resolution (e.g. Quad High Definition (QHD)+) have become the most important factor for the rapid degradation of the smartphone's battery. In another example, along with emails, chats, and updates, many applications need permission from the user(s) to sending notifications. As a result, the smartphone will continue to flash, vibrate, and play notification noises throughout the day. This constant stream of notifications might drain the smartphone's battery. In another example, many applications operate in the background of the smartphone, using data and, as a result, draining the smartphone's battery.

The existing smartphone(s)/methods give a technique to regulate only local processing of smartphone(s) in order to save the battery of the existing smartphone(s). For example, the existing smartphone(s)/methods offer a power selection option (1) (e.g. normal mode, low-power mode, super power-saving mode) to the user(s), requiring them to manually pick an appropriate power selection depending on their needs, as illustrated in FIG. 1. In the low power mode, reduce a frequency of a Central Processing Unit (CPU), a frequency of a Graphics Processing Unit (GPU), and brightness of the screen; shorten an auto screen lock duration, deactivate a Wi-Fi hotspot, a Bluetooth, a Global Positioning System (GPS), and a touch feedback, and allow portrait screen lock to save the battery of the existing smartphone(s). In the super power-saving mode, only contacts, phone, messages, and clock functions can be enabled to save the battery of the existing smartphone(s).

In another example, the existing smartphone(s)/methods can detect that some of the applications consume much power in the background (2), the applications needs to be closed manually by the user(s) to save power, as illustrated in FIG. 1. If the user(s) allows High background power consumption, the application (e.g. V.app) can always run in the background unless the user(s) closes the application manually. In another example, existing smartphone(s)/methods provide a solution for conserving the battery life of existing smartphone(s) by restricting applications that consume a lot of battery power but are not user-friendly.

However, there is no mechanism in the existing smartphone(s) to save the battery without using the local processing. Thus, it is desired to at least provide a useful alternative for optimizing the power consumption in the existing smartphone(s).

SUMMARY

Embodiments of the disclosure enable an application in an electronic device by distributing a portion of a system bandwidth across a plurality of RATs based on mapped power consumption level of a set of power consumption levels of the electronic device and enforcing the distributed system bandwidth across the plurality of RATs in the electronic device based on a plurality of policy-parameters and a user input to optimize power consumption in the electronic device.

Embodiments of the disclosure determine power saving levels (power consumption level) of the electronic device based on a hardware capability of the electronic device and to display the power saving levels/modes to the user on a screen of the electronic device. The user may select an appropriate power saving level based on user requirements, and the electronic device dynamically updates remaining modules of the electronic device, which in-turn changes the behavior of other applications. The selected appropriate power saving level is directly proportional to the bandwidth used for an Uplink (UL) and a Downlink (DL) data transfer.

Embodiments of the disclosure determine the distribution of available system bandwidth among multiple Subscriber Identity Module (SIM)-based on a sub-function of an application and user's application prioritization. The electronic device dynamically decides how much bandwidth allocation can be given to different SIMs based on the power consumption level of access technology/RAT available in the electronic device and application prioritization. Once the bandwidth allocation decides, the electronic device sends commands to corresponding modules of the electronic device so that the constraints can be enforced to the sub-function of the application. Idle mode cell reselection to a lower bandwidth cell, leaving the carrier aggregation and move to appropriate bandwidth cell, bandwidth headroom decision making will be done in this state.

Embodiments of the disclosure identify and display a power-optimized application, as well as a plurality of states of the application's function(s)/sub-function(s), depending on a bandwidth requirement and the available system bandwidth. Because the application's function(s)/sub-function(s)

is bandwidth dependent, the plurality of states of the application's sub-function can be disabled if the bandwidth requirement is not met. Which notifies the user ahead of time that the application's function(s)/sub-function(s) cannot be utilized at a current power saving level.

Embodiments of the disclosure dynamically update the plurality of states of the application's function(s)/sub-function(s) based on the available system bandwidth. The electronic device updates the plurality of states of the application's function(s)/sub-function(s) based on a cell bandwidth availably. Which can happen dynamically for example, if the application's sub-functions are currently disabled and there is still Bandwidth Headroom (BH), and the electronic device re-selects a higher bandwidth cell where the data demand can be met, the electronic device dynamically switches its status from disable to enable. Which can also happen in the opposite direction, from enable to disable, if the electronic device travels from the higher bandwidth cell to the lower bandwidth cell.

Accordingly, various example embodiments herein disclose a method for optimizing power consumption in an electronic device comprising a plurality of RATs. The method includes: determining, by the electronic device, a system bandwidth of the plurality of RATs available in the electronic device. Further, the method includes mapping, by the electronic device, a portion of the system bandwidth to a power consumption level of a set of power consumption levels of the electronic device. Further, the method includes distributing, by the electronic device, the portion of the system bandwidth across the plurality of RATs based on the mapped power consumption level of the set of power consumption levels of the electronic device. Further, the method includes enforcing, by the electronic device, the distributed system bandwidth across the plurality of RATs in the electronic device. Further, the method includes enabling, by the electronic device, an application to use the distributed system bandwidth across the plurality of RATs in the electronic device.

In an example embodiment, determining, by the electronic device, the system bandwidth of the plurality of RATs available in the electronic device includes determining, by the electronic device, a hardware capability of the electronic device, wherein the hardware capability comprises the plurality of RATs available in the electronic device. Further, the method includes detecting, by the electronic device, a RAT bandwidth of each RAT of the plurality of RATs available in the electronic device. Further, the method includes determining, by the electronic device, the system bandwidth by combining the RAT bandwidth of each RAT of the plurality of RATs available in the electronic device.

In an example embodiment, the method further includes normalizing, by the electronic device, the system bandwidth by determining a plurality of coefficients for each RAT of the plurality of RATs available in the electronic device. Further, the method includes calibrating, by the electronic device, the normalized system bandwidth with the set of power consumption levels of the electronic device. The plurality of coefficients is calculated by one of determining, by the electronic device, historical information of bandwidth used in particular RAT and power consumed during that time; applying, by the electronic device, a Machine Learning (ML) model on the historical information of bandwidth used in particular RAT; and determining, by the electronic device, a ratio of the combined RAT bandwidth and the difference between a maximum bandwidth and a minimum bandwidth of the combined RAT bandwidth.

In an example embodiment, mapping the portion of the system bandwidth to the power consumption level of the set of power consumption levels of the electronic device includes displaying, by the electronic device, the system bandwidth and the set of power consumption levels on a screen of the electronic device. Further, the method includes receiving, by the electronic device, a user input performed on the displayed system bandwidth and the set of power consumption levels to select a manual-power consumption level of the set of power consumption levels. Further, the method includes mapping, by the electronic device, the portion of the system bandwidth to the power consumption level based on the user input.

In an example embodiment, displaying, by the electronic device, the system bandwidth and the set of power consumption levels on the screen of the electronic device includes detecting, by the electronic device, a power-mode is enabled by the user of the electronic device. Further, the method includes determining, by the electronic device, a user profile. Further, the method includes automatically selecting, by the electronic device, a power consumption level of the set of power consumption levels based on the user profile. Further, the method includes displaying, by the electronic device, a preview of the system bandwidth and the automatically selected power consumption level of the set of power consumption levels based on the user profile on the screen of the electronic device, where the preview is displayed before the user of the electronic device selects the power consumption level of the set of power consumption levels of the electronic device.

In an example embodiment, the user profile is determined by: identifying, by the electronic device, an application operating on the electronic device using a RAT of the plurality of RATs available in the electronic device; determining, by the electronic device, current time and current location associated with the electronic device while operating the application; and generating, by the electronic device, the user profile based on the identified application, the determined current time, and the determined current location.

In an example embodiment, receiving, by the electronic device, a user input performed on the displayed the system bandwidth and the set of power consumption levels to select the manual-power consumption level of the set of power consumption levels includes determining, by the electronic device, whether the automatically selected power consumption level of the set of power consumption levels based on the user profile is preferable. Further, the method includes storing the automatically selected power consumption level of the set of power consumption levels based on the user profile in response to determining that the automatically selected power consumption level of the set of power consumption levels based on the user profile is preferable. Further, the method includes receiving the user input on the displayed system bandwidth and the set of power consumption levels to select the manual-power consumption level in response to determining that the automatically selected power consumption level of the set of power consumption levels based on the user profile is not preferable, and storing the manual-power consumption level.

In an example embodiment, each power consumption level comprises a unique preview template to display on the screen of the electronic device.

In an example embodiment, distributing, by the electronic device, the portion of the system bandwidth across the plurality of RATs based on the mapped power consumption level of the set of power consumption levels of the electronic device includes detecting, by the electronic device, an optimal power consumption level from one of the automatically selected power consumption level based on the user profile and the manual-power consumption level based on the user input. Further, the method includes activating, by the electronic device, the power-mode by the user of the electronic device for the optimal power consumption level. Further, the method includes determining, by the electronic device, a plurality of policy parameters. Further, the method includes determining, by the electronic device, available system bandwidth to be distributed to each Subscriber Identity Module (SIM) slot, each access technology, and function-sub-function of the application operating on the electronic device based on the plurality of policy parameters.

In an example embodiment, the plurality of policy parameters comprises a number of SIMs available in the electronic device, the RAT available in the electronic device, the application operating on the electronic device using the RAT available in the electronic device.

In an example embodiment, enforcing, by the electronic device, the distributed system bandwidth across the plurality of RATs includes distributing, by the electronic device, the available system bandwidth to each SIM, each access technology, and the function-sub-function of the application operating on the electronic device based on the plurality of policy parameters. Further, the method includes identifying, by the electronic device, a new requirement associated with the function-sub function of the application, where the new requirement indicates that the function-sub function of the application needs a higher system bandwidth than the distributed bandwidth of the function-sub function. Further, the method includes re-mapping, by the electronic device, the portion of the system bandwidth to the power consumption level of the set of power consumption levels of the electronic device for the new requirement. Further, the method includes re-distributing, by the electronic device, the available system bandwidth to each SIM, each access technology, function-sub function of the application operating on the electronic device based on the new requirement.

In an example embodiment, the method further includes calculating, by the electronic device, Bandwidth Headroom (BH) based on the system bandwidth and the detected power consumption level. Further, the method includes determining, by the electronic device, whether the BH is greater than zero. Further, the method includes allocating a delta bandwidth to the SIM which has high priority service by cell reselection to higher bandwidth cell in response to determining that the BH is greater than zero, where the delta bandwidth enables carrier aggregation. Further, the method includes moving the SIM to a lower bandwidth cell in response to determining that the BH is less than zero.

In an example embodiment, enabling, by the electronic device, the application to use the distributed system bandwidth across the plurality of RATs in the electronic device includes displaying the function and sub-function of the application operating on the electronic device on the screen of the electronic device based on distributed bandwidth. Further, the method includes modifying the function and sub-function of the application operating on the electronic device based on the new requirement and displaying the modified function and modified sub-function of the application operating on the electronic device on the screen of the electronic device.

Accordingly, various example embodiments herein disclose the electronic device for optimizing power consumption. The electronic device includes: a power optimizer coupled with a processor and a memory. The power optimizer is configured to determine the system bandwidth of the plurality of RATs available in the electronic device. Further, the power optimizer is configured to map the portion of the system bandwidth to the power consumption level of the set of power consumption levels of the electronic device. Further, the power optimizer is configured to distribute the portion of the system bandwidth across the plurality of RATs based on the mapped power consumption level of the set of power consumption levels of the electronic device. Further, the power optimizer is configured to enforce the distributed system bandwidth across the plurality of RATs in the electronic device. Further, the power optimizer is configured to enable the application to use the distributed system bandwidth across the plurality of RATs in the electronic device.

These and other aspects of the embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the embodiments herein, and the embodiments herein include all such modifications.

BRIEF DESCRIPTION OF THE DRAWINGS

This disclosure is illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1:
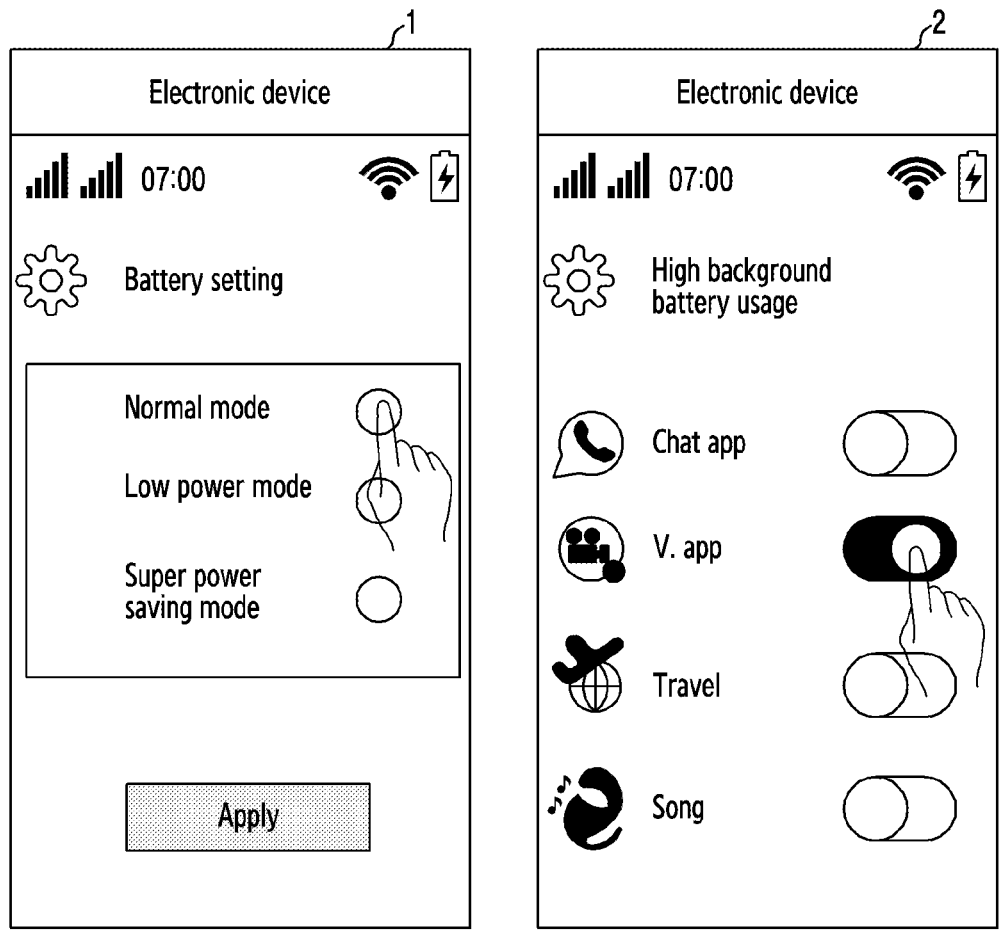
FIG. 1 is a diagram illustrating local processing performed in an existing smartphone(s) to save a battery of the existing smartphone(s), according to the prior art.

The example embodiments herein and the various features and advantageous details thereof are explained more fully with reference to the non-limiting example embodiments illustrated in the accompanying drawings and detailed in the following description. Descriptions of well-known components and processing techniques may be omitted so as to not unnecessarily obscure the embodiments herein. Also, the various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Various embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure The accompanying drawings are used to help understand various technical features and it should be understood that the embodiments presented herein are not limited by the accompanying drawings. As such, the disclosure should be understood to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, various example embodiments herein disclose a method for optimizing power consumption in an electronic device comprising a plurality of RATs. The method includes determining, by the electronic device, a system bandwidth of the plurality of RATs available in the electronic device. Further, the method includes mapping, by the electronic device, a portion of the system bandwidth to a power consumption level of a set of power consumption levels of the electronic device. Further, the method includes distributing, by the electronic device, the portion of the system bandwidth across the plurality of RATs based on the mapped power consumption level of the set of power consumption levels of the electronic device. Further, the method includes enforcing, by the electronic device, the distributed system bandwidth across the plurality of RATs in the electronic device. Further, the method includes enabling, by the electronic device, an application to use the distributed system bandwidth across the plurality of RATs in the electronic device.

Accordingly, various example embodiments herein disclose an electronic device for optimizing power consumption. The electronic device includes a power optimizer coupled with a processor and a memory. The power optimizer is configured to determine the system bandwidth of the plurality of RATs available in the electronic device. Further, the power optimizer is configured to map the portion of the system bandwidth to the power consumption level of the set of power consumption levels of the electronic device. Further, the power optimizer is configured to distribute the portion of the system bandwidth across the plurality of RATs based on the mapped power consumption level of the set of power consumption levels of the electronic device. Further, the power optimizer is configured to enforce the distributed system bandwidth across the plurality of RATs in the electronic device. Further, the power optimizer is configured to enable the application to use the distributed system bandwidth across the plurality of RATs in the electronic device.

Unlike existing methods and systems, the disclosed method allows the electronic device to enable the application in the electronic device by distributing the portion of the system bandwidth across the plurality of RATs based on mapped power consumption level of the set of power consumption levels of the electronic device and enforcing the distributed system bandwidth across the plurality of RATs in the electronic device based on the plurality of policy-parameters and the user input to optimize power consumption in the electronic device.

Unlike existing methods and systems, the disclosed method allows the electronic device to determine power saving levels (power consumption level) of the electronic device based on the hardware capability of the electronic device and to display the power saving levels/modes to the user on the screen of the electronic device. The user selects the appropriate power saving level based on his or her needs, and the electronic device dynamically updates remaining modules of the electronic device, which in-turn changes the behavior of other applications. The selected appropriate power saving level is directly proportional to the bandwidth used for the UL and the DL data transfer.

Unlike existing methods and systems, the disclosed method allows the electronic device to determine the distribution of available system bandwidth among multiple SIM based on the sub-function of the application and the user's application prioritization. The electronic device dynamically decides how much bandwidth allocation can be given to different SIMs based on the power consumption level of access technology/RAT available in the electronic device and application prioritization. Once the bandwidth allocation decides, the electronic device sends commands to corresponding modules of the electronic device so that the constraints can be enforced to the sub-function of the application. Idle mode cell reselection to a lower bandwidth cell, leaving the carrier aggregation and move to appropriate bandwidth cell, bandwidth headroom decision making will be done in this state.

Unlike existing methods and systems, the disclosed method allows the electronic device to identify and display a power-optimized application, as well as the plurality of states of the application's function(s)/sub-function(s), depending on a bandwidth requirement and the available system bandwidth. Because the application's function(s)/sub-function(s) is bandwidth dependent, the plurality of states of the application's sub-function can be disabled if the bandwidth requirement is not met. Which notifies the user ahead of time that the application's function(s)/sub-function(s) cannot be utilized at the current power saving level.

Unlike existing methods and systems, the disclosed method allows the electronic device to dynamically update the plurality of states of the application's function(s)/sub-function(s) based on the available system bandwidth. The electronic device updates the plurality of states of the application's function(s)/sub-function(s) based on a cell bandwidth availability. Which can happen dynamically for example, if the application's sub-functions are currently disabled and there is still BH, and the electronic device re-selects the higher bandwidth cell where the data demand can be met, the electronic device dynamically switches its status from disable to enable. Which can also happen in the opposite direction, from enable to disable, if the electronic device travels from the higher bandwidth cell to the lower bandwidth cell.

Referring now to the drawings, where similar reference characters denote corresponding features consistently throughout the figures, there are shown various example embodiments.

Figure 2:
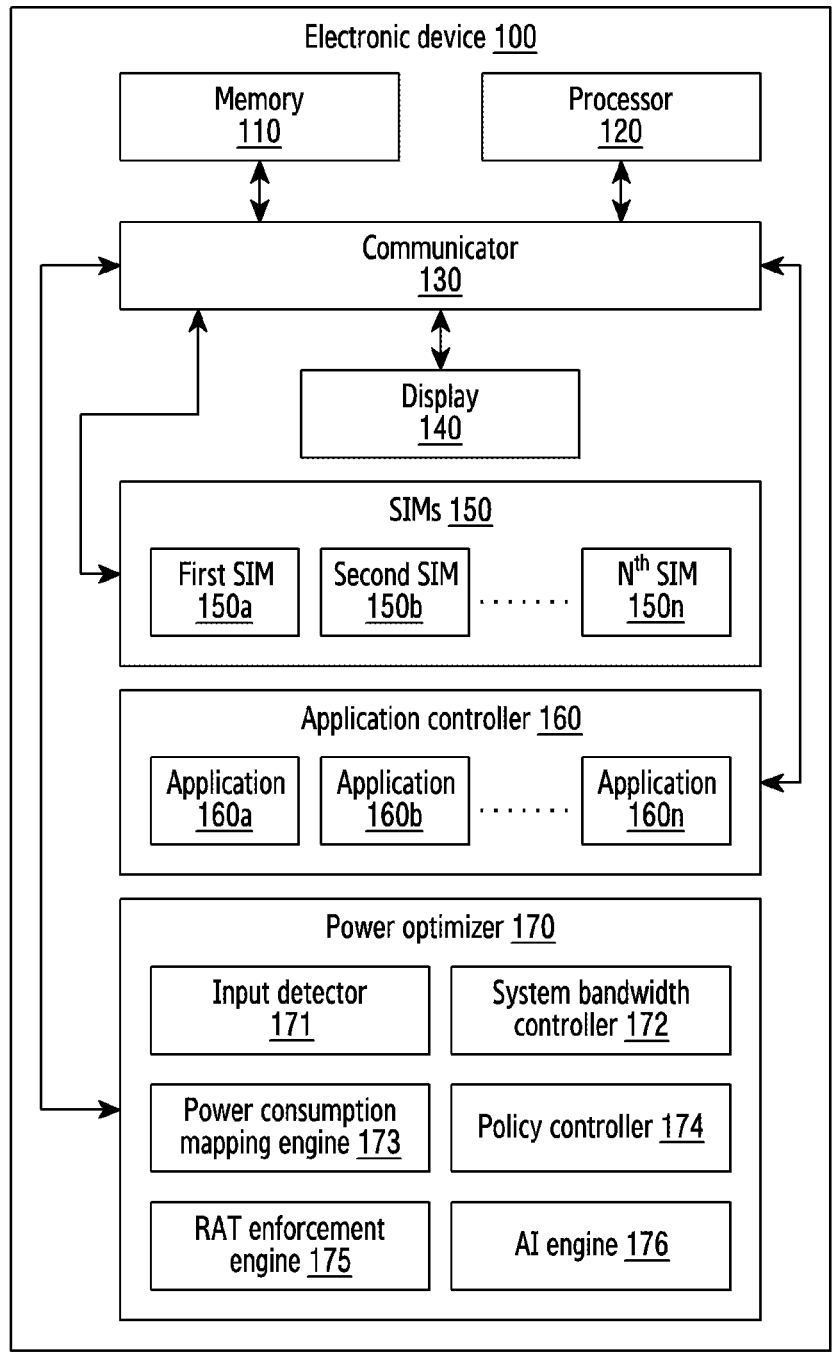
FIG. 2 is a block diagram illustrating an example configuration of an electronic device for optimizing power consumption by regulating bandwidth or dynamically controlling bandwidth, according to various embodiments.

FIG. 2 is a block diagram illustrating an example configuration of an electronic device (100) for optimizing power consumption by regulating bandwidth or dynamically controlling bandwidth, according to various embodiments. The electronic device (100) can be, for example, but not limited to a smartphone, a laptop, an internet of things (IoT) device, a User Equipment (UE), or alike.

In an embodiment, the electronic device (100) includes a memory (110), a processor (e.g., including processing circuitry) (120), a communicator (e.g., including communication circuitry) (130), a display (140), a SIM(s) (150), an application controller (e.g., including various processing circuitry and/or executable program instructions) (160) and a power optimizer (e.g., including various processing circuitry and/or executable program instructions) (170).

The memory (110) stores a performance mapping table, a hardware capability of the electronic device (100), a normalization table, a power level profile table, a power level history table, a preview mapping table, an application state table, and an access technology mapped bandwidth for Multi-SIM table. Throughout this disclosure, the terms "table" and "data" are used interchangeably and may mean the same.

Further, the memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in various examples, be considered a non-transitory storage medium. The term "non-transitory" may indicate that the storage medium is not embodied in a carrier wave or a propagated signal. However, the term "non-transitory" should not be interpreted that the memory (110) is non-movable. In various examples, the memory (110) can be configured to store larger amounts of information. In certain examples, a non-transitory storage medium may store data that can, over time, change (e.g., in Random Access Memory (RAM) or cache). The memory (110) can be an internal storage unit or it can be an external storage unit of the electronic device (100), a cloud storage, or any other type of external storage.

The processor (120) may include various processing circuitry and communicates with the memory (110), the communicator (130), the display (140), the SIM(s) (150), the application controller (160), and the power optimizer (170). The processor (120) is configured to execute instructions stored in the memory (110) and to perform various processes. The processor may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an AI dedicated processor such as a neural processing unit (NPU).

The communicator (130) may include an electronic circuit specific to a standard that enables wired or wireless communication. The communicator (130) is configured for communicating internally between internal hardware components and with external devices via one or more networks. The display (140) is configured to display the application on a screen of the electronic device (100). The SIM(s) (150) includes a primary SIM (150*a*) (e.g. First SIM) and a secondary SIM (150*b*-150*n*).

The application controller (160) may include various circuitry and/or executable program instructions, and is configured to control a plurality of applications (160*a*-160*n*) and stores the function and sub-function of each application of the electronic device (100). Examples for the application include, but not limited to a media application, a web application, a video player application, a camera application, a game application, a business application, an education application, a lifestyle application, an entertainment application, a utility application, a travel application, etc.

In an embodiment, the application controller (160) displays a function and sub-function of the application operating on the electronic device (100) on the screen of the electronic device (100) based on distributed bandwidth. Further, the application controller (160) modifies the function and sub-function of the application operating on the electronic device (100) based on a new requirement and displaying the modified function and modified sub-function of the application operating on the electronic device (100) on the screen of the electronic device (100).

In an embodiment, the power optimizer (170) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In an embodiment, the power optimizer (170) includes an input detector (171), a system bandwidth controller (172), a power consumption mapping engine (173), a policy controller (174), a RAT enforcement engine (175), and an AI engine (176).

In an embodiment, the system bandwidth controller (172) determines a hardware capability of the electronic device (100), where the hardware capability comprises the plurality of RATs available in the electronic device (100). Further, the system bandwidth controller (172) detects a RAT bandwidth of each RAT of the plurality of RATs available in the electronic device (100). Further, the system bandwidth controller (172) determines the system bandwidth by combining the RAT bandwidth of each RAT of the plurality of RATs available in the electronic device (100). Further, the system bandwidth controller (172) normalizes the system bandwidth by determining a plurality of coefficients for each RAT of the plurality of RATs available in the electronic device (100). The plurality of coefficients is calculated by determining historical information of bandwidth used in particular RAT and power consumed during that time or applying an ML model (AI engine (176)) on the historical information of bandwidth used in particular RAT or determining a ratio of the combined RAT bandwidth and the difference between a maximum bandwidth and a minimum bandwidth of the combined RAT bandwidth. Further, the system bandwidth controller (172) calibrates the normalized system bandwidth with the set of power consumption levels of the electronic device (100).

In an embodiment, the power consumption mapping engine (173) displays the system bandwidth and the set of power consumption levels on a screen of the electronic device (100). Further, the power consumption mapping engine (173) receives a user input, using the input detector (171), performed on the displayed system bandwidth and the set of power consumption levels to select a manual-power consumption level of the set of power consumption levels. Further, the power consumption mapping engine (173) maps the portion of the system bandwidth to the power consumption level based on the user input.

In an embodiment, the power consumption mapping engine (173) detects, using the input detector (171), a power-mode is enabled by the user of the electronic device (100). Further, the power consumption mapping engine (173) determines a user profile. The user profile is determined by identifying an application operating on the electronic device (100) using a RAT of the plurality of RATs available in the electronic device (100) or determining the current time and current location associated with the electronic device (100) while operating the application. Further, the power consumption mapping engine (173) generates the user profile based on the identified application, the determined current time, and the determined current location. Further, the power consumption mapping engine (173) automatically selects a power consumption level of the set of power consumption levels based on the user profile. Further, the power consumption mapping engine (173) displays a preview of the system bandwidth and the automatically selected power consumption level of the set of power consumption levels based on the user profile on the screen of the electronic device (100), where the preview is displayed before the user of the electronic device (100) selects the power consumption level of the set of power consumption levels of the electronic device (100).

In an embodiment, the power consumption mapping engine (173) determines whether automatically selected power consumption level of the set of power consumption levels based on the user profile is preferable. Further, the power consumption mapping engine (173) stores storing the automatically selected power consumption level of the set of power consumption levels based on the user profile in response to determining that the automatically selected power consumption level of the set of power consumption levels based on the user profile is preferable. Further, the power consumption mapping engine (173) receives, using the input detector (171), the user input on the displayed system bandwidth and the set of power consumption levels to select the manual-power consumption level in response to determining that the automatically selected power consumption level of the set of power consumption levels based on the user profile is not preferable, and stores the manual-power consumption level. Each power consumption level comprises a unique preview template to display on the screen of the electronic device (100).

In an embodiment, the policy controller (174) detects an optimal power consumption level from one of the automatically selected power consumption level based on the user profile and the manual-power consumption level based on the user input. Further, the policy controller (174) activates, using the input detector (171), the power mode by the user of the electronic device (100) for the optimal power consumption level. Further, the policy controller (174) determines a plurality of policy parameters. The plurality of policy parameters comprises a number of SIM (150) slot available in the electronic device (100), the RAT available in the electronic device (100), the application operating on the electronic device (100) using the RAT available in the electronic device (100). Further, the policy controller (174) determines available system bandwidth to be distributed to each Subscriber Identity Module (SIM) slot, each access technology, and function-sub-function of the application operating on the electronic device (100) based on the plurality of policy parameters.

In an embodiment, the RAT enforcement engine (175) distributes the available system bandwidth to each SIM (150) slot, each access technology, and the function-sub-function of the application operating on the electronic device (100) based on the plurality of policy parameters. Further, the RAT enforcement engine (175) identifies a new requirement associated with the function-sub function of the application, where the new requirement indicates that the function-sub function of the application needs a higher system bandwidth than the distributed bandwidth of the function-sub-function. Further, the RAT enforcement engine (175) remaps the portion of the system bandwidth to the power consumption level of the set of power consumption levels of the electronic device (100) for the new requirement. Further, the RAT enforcement engine (175) re-distributes the available system bandwidth to each SIM (150), each access technology, function-sub-function of the application operating on the electronic device (100) based on the new requirement.

In an embodiment, the RAT enforcement engine (175) calculates a BH based on the system bandwidth and the detected power consumption level. Further, the RAT enforcement engine (175) determines whether the BH is greater than zero. Further, the RAT enforcement engine (175) allocates a delta bandwidth to the SIM (150) which has high priority service by cell reselection to higher bandwidth cell in response to determining that the BH is greater than zero, where the delta bandwidth enables carrier aggregation. Further, the RAT enforcement engine (175) moves the SIM (150) slot to the lower bandwidth cell in response to determining that the BH is less than zero.

At least one of the plurality of modules/components, as mentioned above, maybe be implemented through the AI engine (176). A function associated with the AI engine (176) may be performed through memory (110) and the processor (120). One or a plurality of processors controls the processing of the input data in accordance with a predefined operating rule or the AI engine (176) stored in the non-volatile memory and the volatile memory. The predefined operating rule or artificial intelligence model is provided through training or learning.

Being provided through learning may refer, for example to, by applying a learning process to a plurality of learning data, a predefined operating rule or the AI engine (176) of the desired characteristic being made. The learning may be performed in the electronic device (100) itself in which AI according to an embodiment is performed, and/or maybe implemented through a separate server/system.

The AI engine (176) may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process may refer to a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although FIG. 2 shows various hardware components of the electronic device (100) but it is to be understood that other embodiments are not limited thereon. In other embodiments, the electronic device (100) may include less or more number of components. Further, the labels or names of the components are used only for illustrative purpose and does not limit the scope of the disclosure. One or more components can be combined together to perform same or substantially similar function to optimize the power consumption.

Figure 3A:
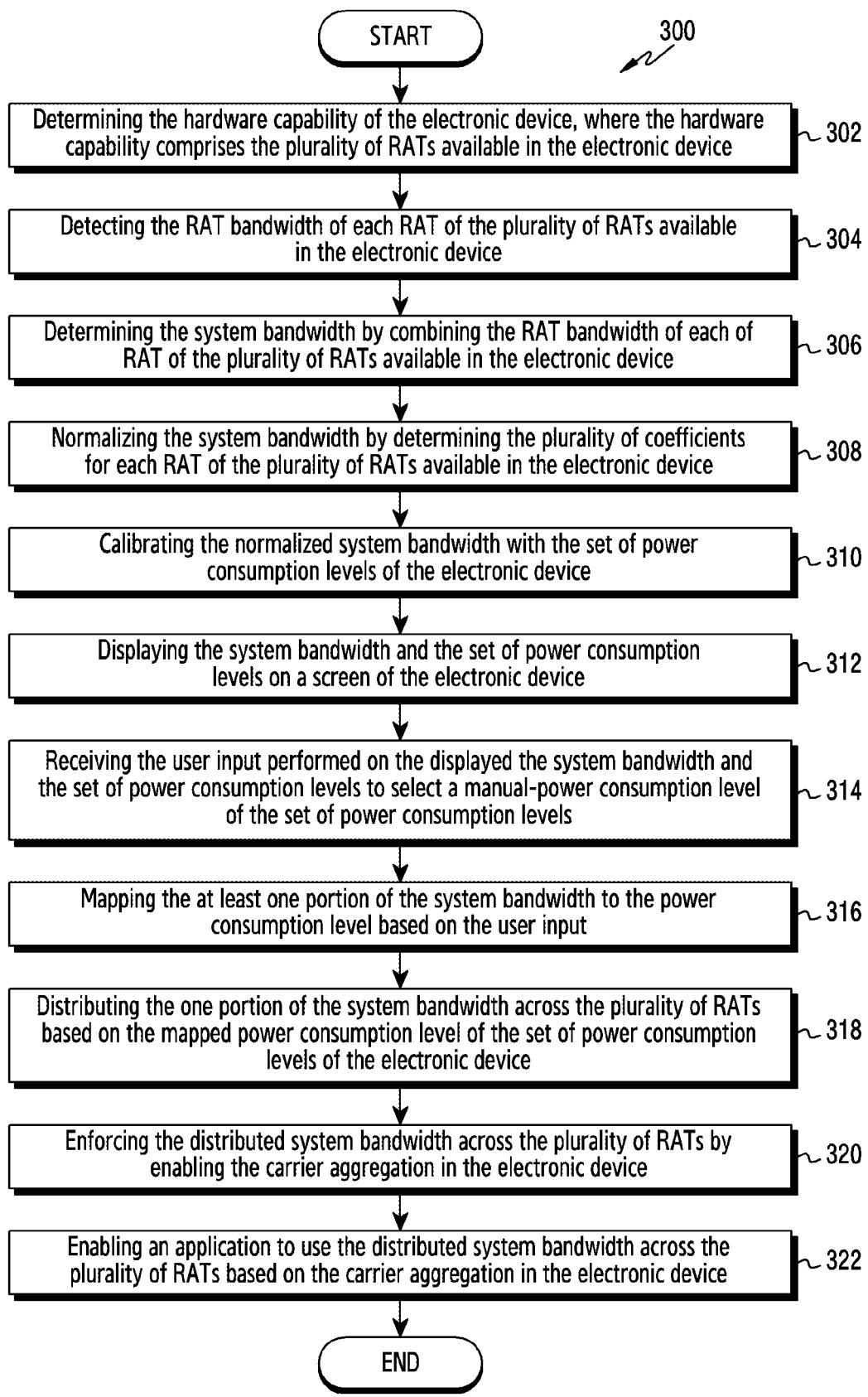
FIG. 3A is a flowchart illustrating an example method for optimizing the power consumption in the electronic device by regulating bandwidth or dynamically controlling bandwidth, according to various embodiments.

FIG. 3A is a flowchart (300) illustrating an example method for optimizing the power consumption in the electronic device (100) by regulating bandwidth or dynamically controlling bandwidth, according to various embodiments. The operations (302-322) are performed by the electronic device (100).

At 302, the method includes determining the hardware capability of the electronic device, where the hardware capability comprises the plurality of RATs available in the electronic device (100). At 304, the method includes detecting the RAT bandwidth of each RAT of the plurality of RATs available in the electronic device (100). At 306, the method includes determining the system bandwidth by combining the RAT bandwidth of each of RAT of the plurality of RATs available in the electronic device (100). For example, SIM-1 (150a) is connected to a cell-1, which has a bandwidth of X MHz; SIM-2 (150b) is connected to a cell-2, which has a bandwidth of Y MHz; SIM-N (150n) is connected to a cell-n, which has a bandwidth of Z MHz, then the system bandwidth is (X+Y+Z) MHz.

At 308, the method includes normalizing the system bandwidth by determining the plurality of coefficients for each RAT of the plurality of RATs available in the electronic device (100). The normalized system bandwidth is calculated by the below equation, $$\text{Normalized system bandwidth}(X) = [\text{Gamma}] * [(\text{Cellular bandwidth\_4G}) * A + (\text{Wi-Fi Bandwidth}) * B + (\text{Cellular\_5G}) * C + \ldots] \quad (1)$$

$$\text{Gamma} = (\text{Current system bandwidth}/(\text{Max system bandwidth} - \text{min system bandwidth})) \quad (2)$$

Where, the plurality of coefficients (e.g., A, B, C . . . ) is calculated based on historical information of bandwidth used in particular access technology/RAT and power consumed during that time. The plurality of coefficients can be fine-tuned during the operations based on historical information or based on some statistical method/ML etc. The plurality of coefficients calculation can be done based on various normalization mechanisms (e.g. min-max normalization, Z-score Normalization, etc.). Due to the normalization impact of different scales of access technology can be removed.

Now consider an example scenario in which: SIM-1 (150a) 5G=100 MHz, SIM-2 (150b) 5G=100 MHz, and Wi-Fi=100 MHz. Maximum system bandwidth supported is 510 MHz and minimum system bandwidth supported is 10 MHz. Gamma is 0.5 (250/500). Let's take max-min normalization method to get coefficients: A=(20−0)/(100−0)=0.2, B=(10−0)/(50−0)=0.2 and C=(10−0)/100−0)=0.1. Now, put all coefficients values in equation 1, then the normalized system bandwidth (x) is 20.

At 310, the method includes calibrating the normalized system bandwidth with the set of power consumption levels of the electronic device (100), for example, the power mapping table as shown in Table. 1 and the plurality of coefficients (e.g., A, B, C . . . ) calculated based on historical information of bandwidth used in particular access technology/RAT and power consumed during that time, for example, the normalizing table as shown in Table. 2.

TABLE 1

| Normalized system bandwidth | Power consumption levels |
| --- | --- |
| B => (X1 -> X2) | P1 |
| B => (X2 -> X3) | P2 |
| B => (X3 -> X4) | P3 |

TABLE 2

| Access Technology | Bandwidth | Pmax | Pmin | Pavg. | Duration |
| --- | --- | --- | --- | --- | --- |
| Cellular_4g | X MHZ | P1 | Q1 | K1 | T1 |
| Cellular_5g | Y MHZ | P2 | Q2 | K2 | T2 |
| Wi-Fi | Z MHz | P3 | Q3 | K3 | T3 |

At 312, the method includes displaying the system bandwidth and the set of power consumption levels on a screen of the electronic device (100). At 314, the method includes receiving the user input performed on the displayed system bandwidth and the set of power consumption levels to select the manual-power consumption level of the set of power consumption levels. At 316, the method includes mapping the portion of the system bandwidth to the power consumption level based on the user input. At 318, the method includes distributing one portion of the system bandwidth across the plurality of RATs based on the mapped power consumption level of the set of power consumption levels of the electronic device (100). At 320, the method includes enforcing the distributed system bandwidth across the plurality of RATs by enabling the carrier aggregation in the electronic device (100). At 322, the method includes enabling an application to use the distributed system bandwidth across the plurality of RATs based on the carrier aggregation in the electronic device (100).

Figure 3B:
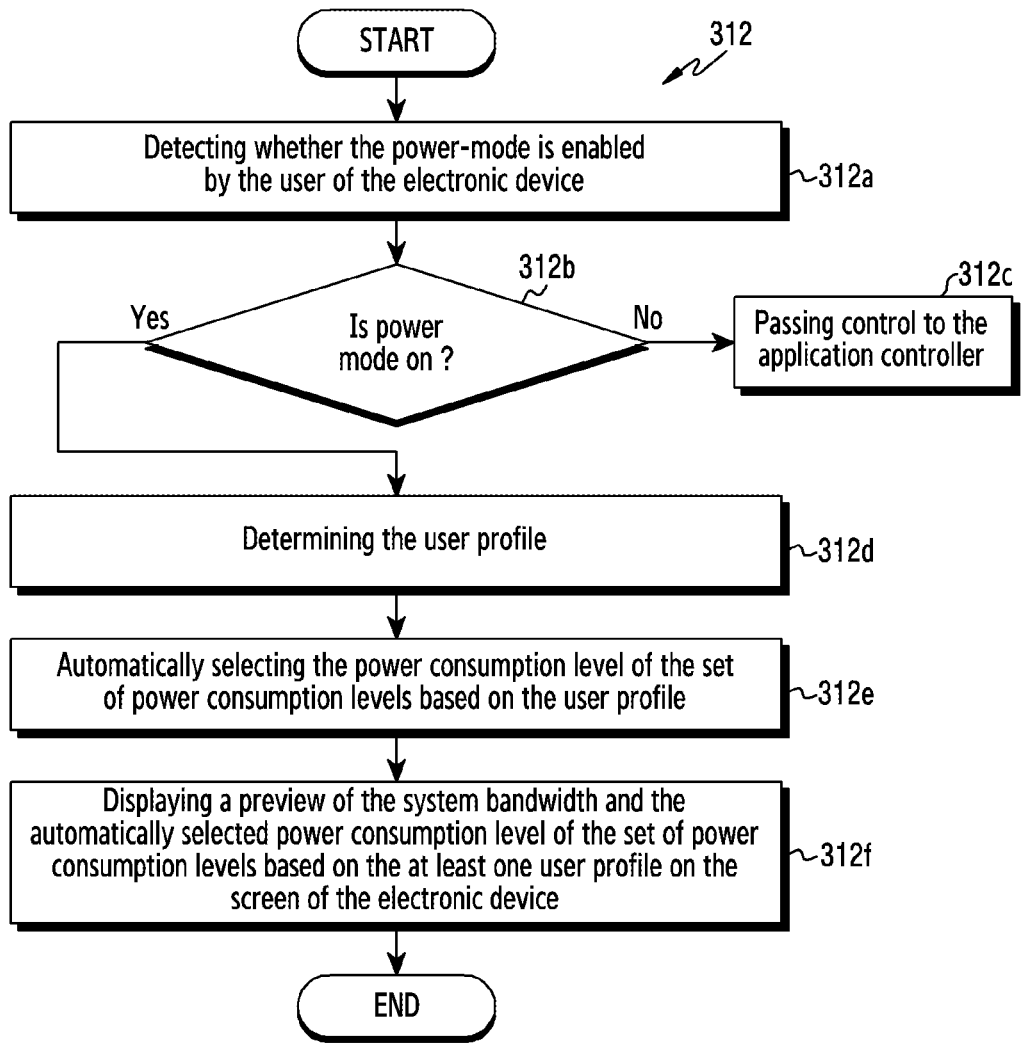
FIG. 3B is a flowchart illustrating example operations for displaying a system bandwidth and a set of power consumption levels on a screen of the electronic device, according to various embodiments.

FIG. 3B is a flowchart (312) illustrating example operations for displaying the system bandwidth and the set of power consumption levels on the screen of the electronic device (100), according to various embodiments. The operations (312a-312f) are performed by the electronic device (100).

At 312a-312b, the method includes detecting whether the power-mode is enabled by the user of the electronic device (100). At 312c, the method includes passing control to the application controller (160) in response to determining that the power mode is disabled. At 312d, the method includes determining the user profile in response to determining that the power-mode is enabled by the user of the electronic device (100). The user profile is determined by identifying the application (e.g. video application running on the SIM-1 (150a)) operating on the electronic device (100) using the RAT of the plurality of RATs available in the electronic device (100), current time, and current location associated with the electronic device (100) while operating the application.

At 312e, the method includes automatically selecting the power consumption level of the set of power consumption levels based on the user profile, for example, the power level profile table as shown in Table. 3.

TABLE 3

| TIME | Location | Access technology | APP NAME-1 | APP NAME-2 | Profile |
|---|---|---|---|---|---|
| T1 | L1 | Acc_1 | App-1 | None | Prof_1 |
| T1 | L2 | Acc_2 | App-1 | None | Prof_2 |
| T2 | L3 | Acc_1 | App-2 | None | Prof_3 |

At 312f, the method includes displaying the preview of the system bandwidth and the automatically selected power consumption level of the set of power consumption levels based on the user profile on the screen of the electronic device (100).

Figure 3C:
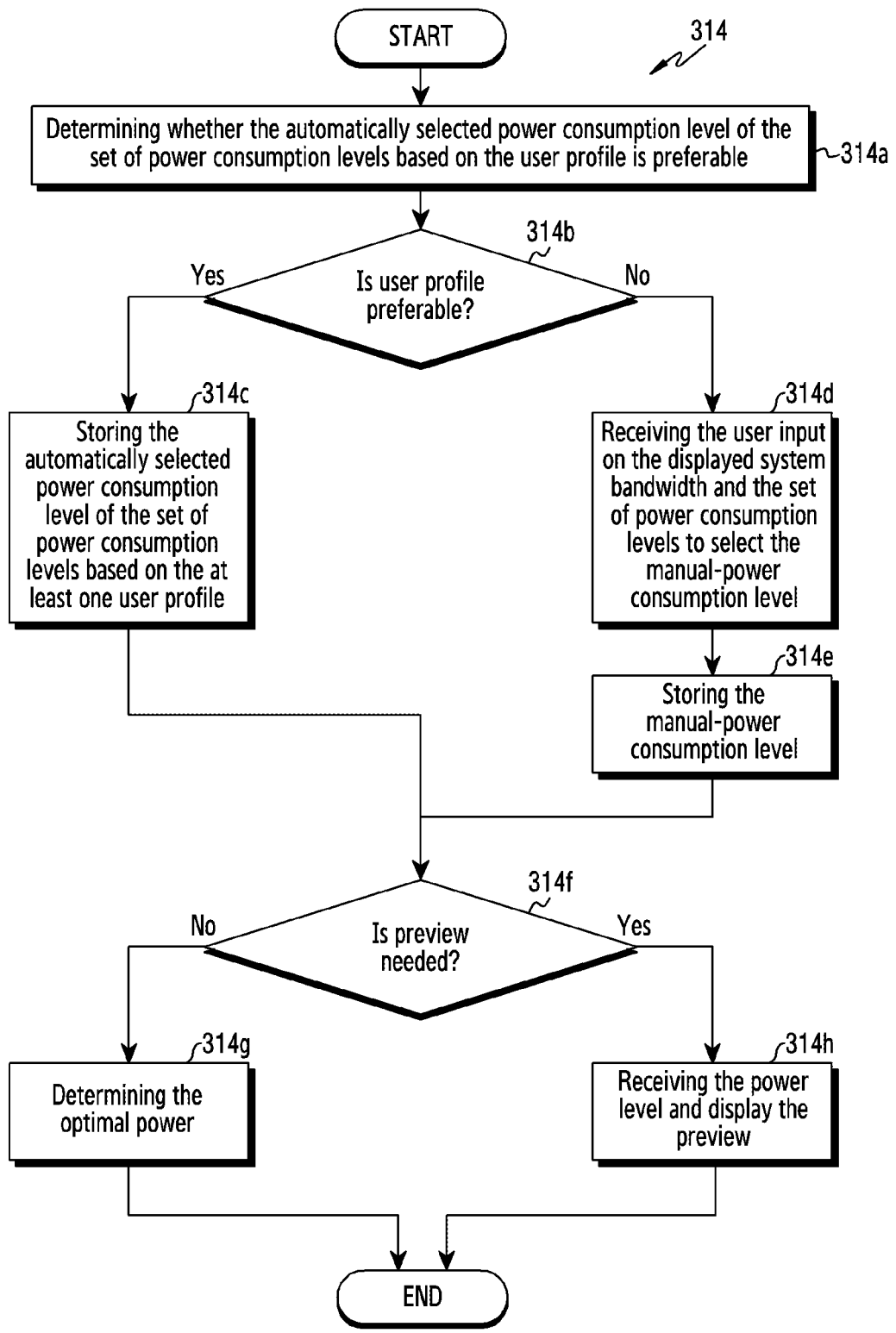
FIG. 3C is a flowchart illustrating example operations for receiving a user input performed on the displayed system bandwidth and the set of power consumption levels to select a manual-power consumption level of the set of power consumption levels, according to various embodiments.

FIG. 3C is a flowchart (314) illustrating example operations for receiving the user input performed on the displayed system bandwidth and the set of power consumption levels to select the manual-power consumption level of the set of power consumption levels, according to various embodiments. The operations (314a-314h) are performed by the electronic device (100).

At 314a-314b, the method includes determining whether the automatically selected power consumption level of the set of power consumption levels based on the user profile is preferable. At 314c, the method includes storing the automatically selected power consumption level of the set of power consumption levels based on the user profile in response to determining that the automatically selected power consumption level of the set of power consumption levels based on the user profile is preferable, for example, the power level history table as shown in Table. 4. At 314d-314e, the method includes receiving the user input on the displayed system bandwidth and the set of power consumption levels to select the manual-power consumption level in response to determining that the automatically selected power consumption level of the set of power consumption levels based on the user profile is not preferable and storing the manual-power consumption level, for example, the power level history table as shown in Table. 4.

TABLE 4

| Time | Location | Profile | Power Level |
|---|---|---|---|
| T1 | L1 | Prof_1 | P1 |
| T1 | L2 | Prof_2 | P2 |
| T2 | L3 | Prof_3 | P3 |

At 314f, the method includes determining whether the preview is needed. At 314g, the method includes determining the optimal power level in response to determining that the preview is not needed. At 314h, the method includes receiving the power level and display the preview on the screen of the electronic device (100) in response to determining that the preview is needed, for example, the preview mapping table as shown in Table. 5.

TABLE 5

| Power level | Preview Template |
|---|---|
| P1 | PRE_TEM1 |
| P2 | PRE_TEM2 |
| P3 | PRE_TEM3 |

Figure 3D:
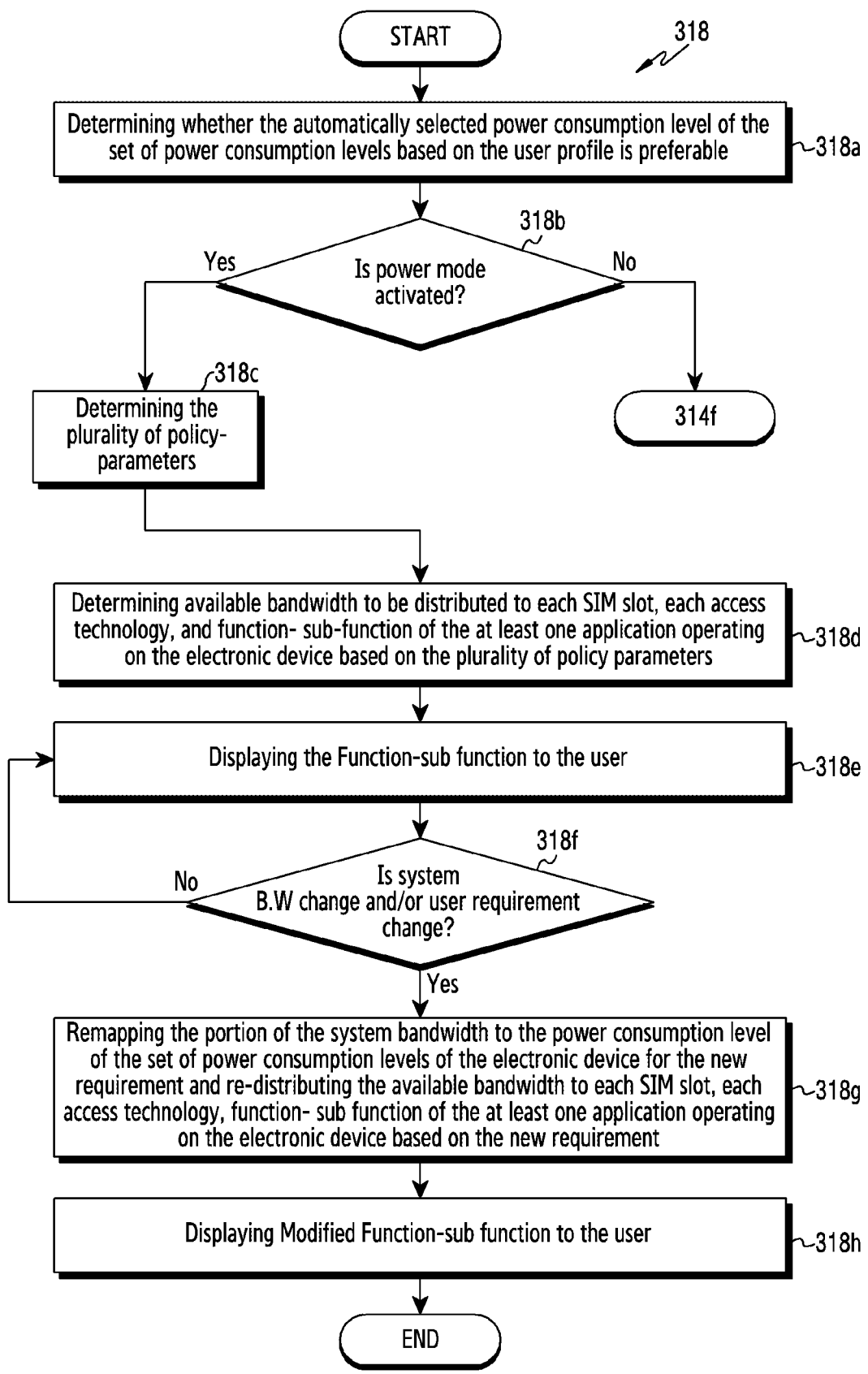
FIG. 3D is a flowchart illustrating example operations for distributing the portion of the system bandwidth across the plurality of RATs based on the mapped power consumption level of the set of power consumption levels of the electronic device and enforcing the distributed system bandwidth across the plurality of RATs in the electronic device, according to various embodiments.

FIG. 3D is a flowchart (318) illustrating example operations for distributing the portion of the system bandwidth across the plurality of RATs based on the mapped power consumption level of the set of power consumption levels of the electronic device (100) and enforcing the distributed system bandwidth across the plurality of RATs in the electronic device (100), according to various embodiments. The operations (318a-318h) are performed by the electronic device (100).

At 318a, the method includes detecting the optimal power consumption level from the automatically selected power consumption level based on the user profile or the manual-power consumption level based on the user input. At 318b, the method includes determining whether the power-mode is activated by the user of the electronic device (100) for the optimal power consumption level. At 318c, the method includes determining the plurality of policy parameters in response to determining that the power mode is activated by the user of the electronic device (100) for the optimal power consumption level. At 318d, the method includes determining available bandwidth to be distributed to each SIM (150) slot, each access technology/RAT, and function-sub-function of the application operating on the electronic device (100) based on the plurality of policy parameters, for example, the access technology mapped bandwidth for Multi-SIM table as shown in Table. 6.

TABLE 6

| Access technology | Power level | Sim-1 BW allocation | Sim-2 BW allocation |
|---|---|---|---|
| ACC_TECH_1 | P1 | BW_x | BW_y |
| ACC_TECH_2 | P1 | BW_p | BW_q |
| ACC_TECH_3 | P1 | BW_m | BW_n |
| ACC_TECH_1 | P2 | BX_1 | BX_2 |
| ACC_TECH_2 | P3 | BX_3 | BX_4 |

At 318e, the method includes displaying the function-sub function to the user, for example, the application state table as shown in Table. 7.

TABLE 7

| Application name | Power level | Functional state |
|---|---|---|
| APP1 | P1 | Func-1 (Enabled), Func-2 (Disabled), Func-3 (Disabled) |
| APPP2 | P2 | Func-1 (Enabled), Func-2 (Enabled), Func-3 (Disabled) |
| APPP3 | P3 | Func-1 (Disabled), Func-2 (Disabled), Func-3 (Disabled) |

At 318f, the method includes determining whether the system bandwidth change and/or user requirement is change. At 318g, the method includes remapping the portion of the system bandwidth to the power consumption level of the set of power consumption levels of the electronic device (100) for the new requirement and re-distributing the available bandwidth to each SIM (150) slot, each RAT, the function-sub function of the application operating on the electronic device (100) based on the new requirement. At 318h, the method includes displaying the modified Function-sub function to the user.

The various actions, acts, blocks, steps, or the like in the flow diagram (300,312,314,318) may be performed in the order presented, in a different order or simultaneously. Further, in various embodiments, some of the actions, acts, blocks, steps, or the like may be omitted, added, modified, skipped, or the like without departing from the scope of the disclosure.

Figure 4A:
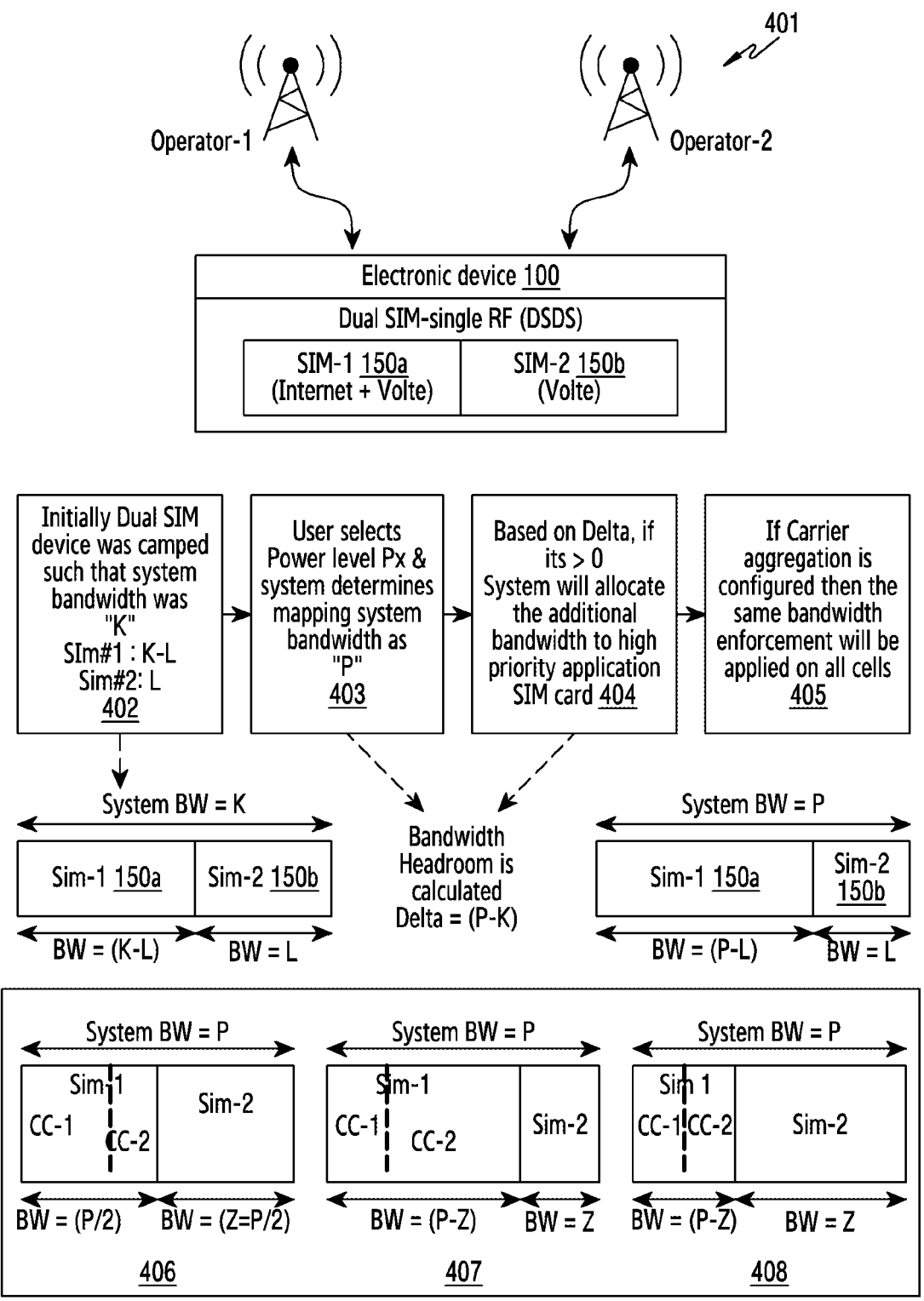
FIGS. 4A, 4B and 4C are diagrams illustrating example use cases for a BH calculation of various hardware capabilities and distributing the portion of the system bandwidth across the plurality of RATs based on the BH calculation and application priority, according to various embodiments.
Figure 4B:
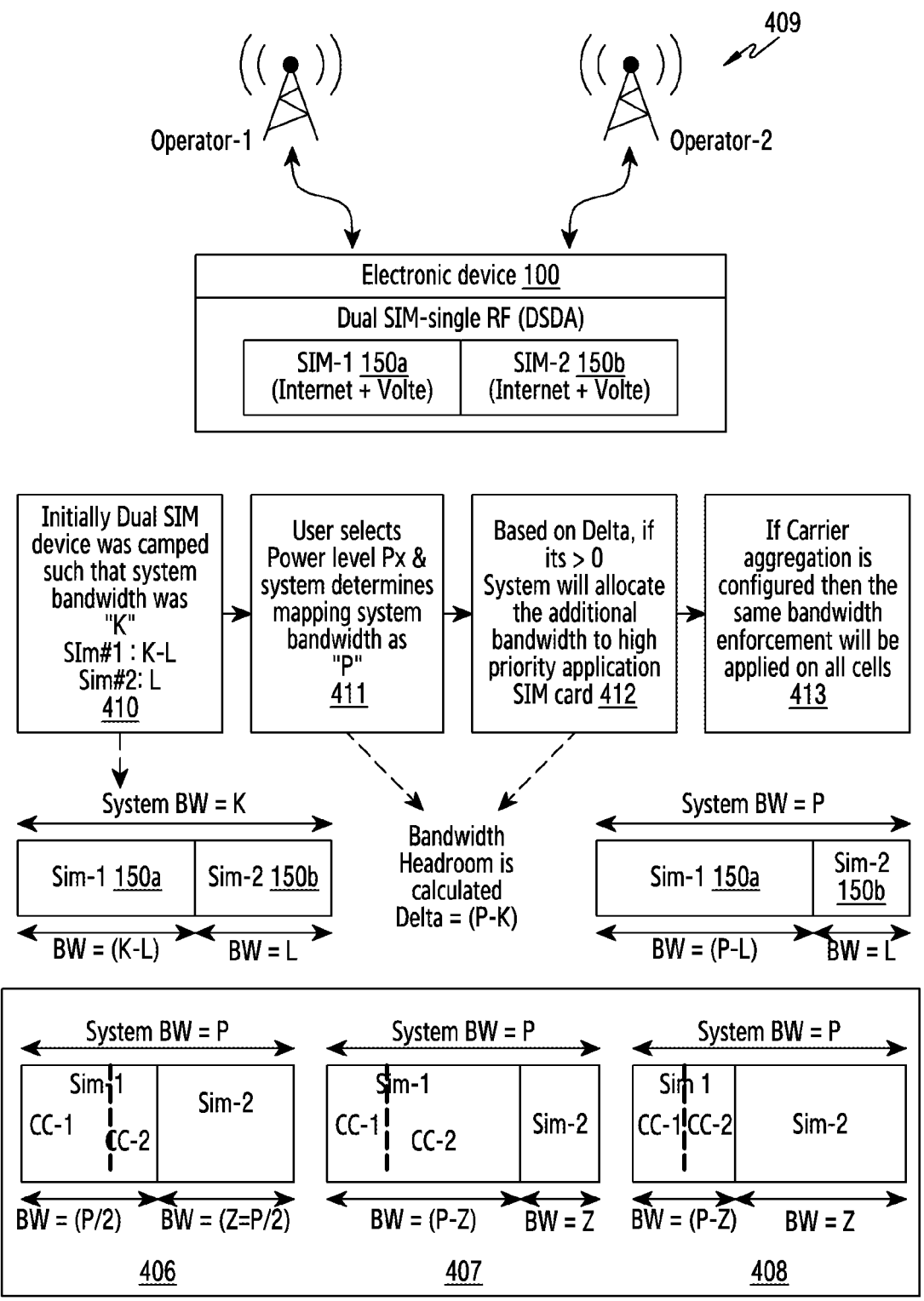
Figure 4C:
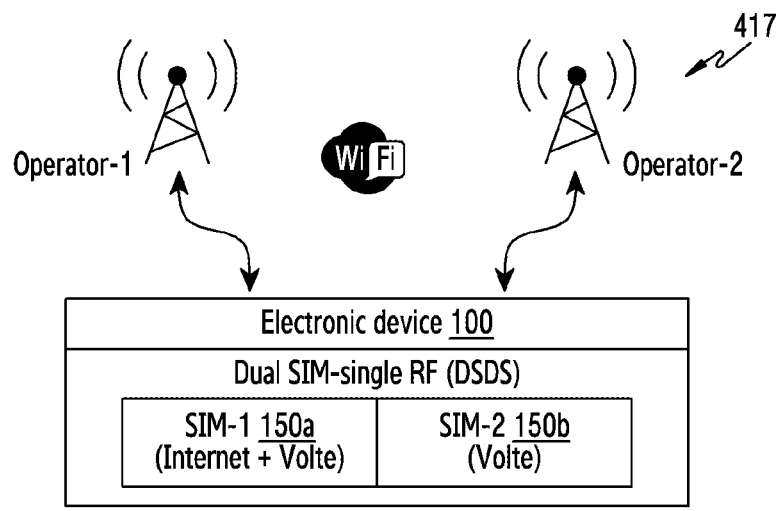
Figure 4C:
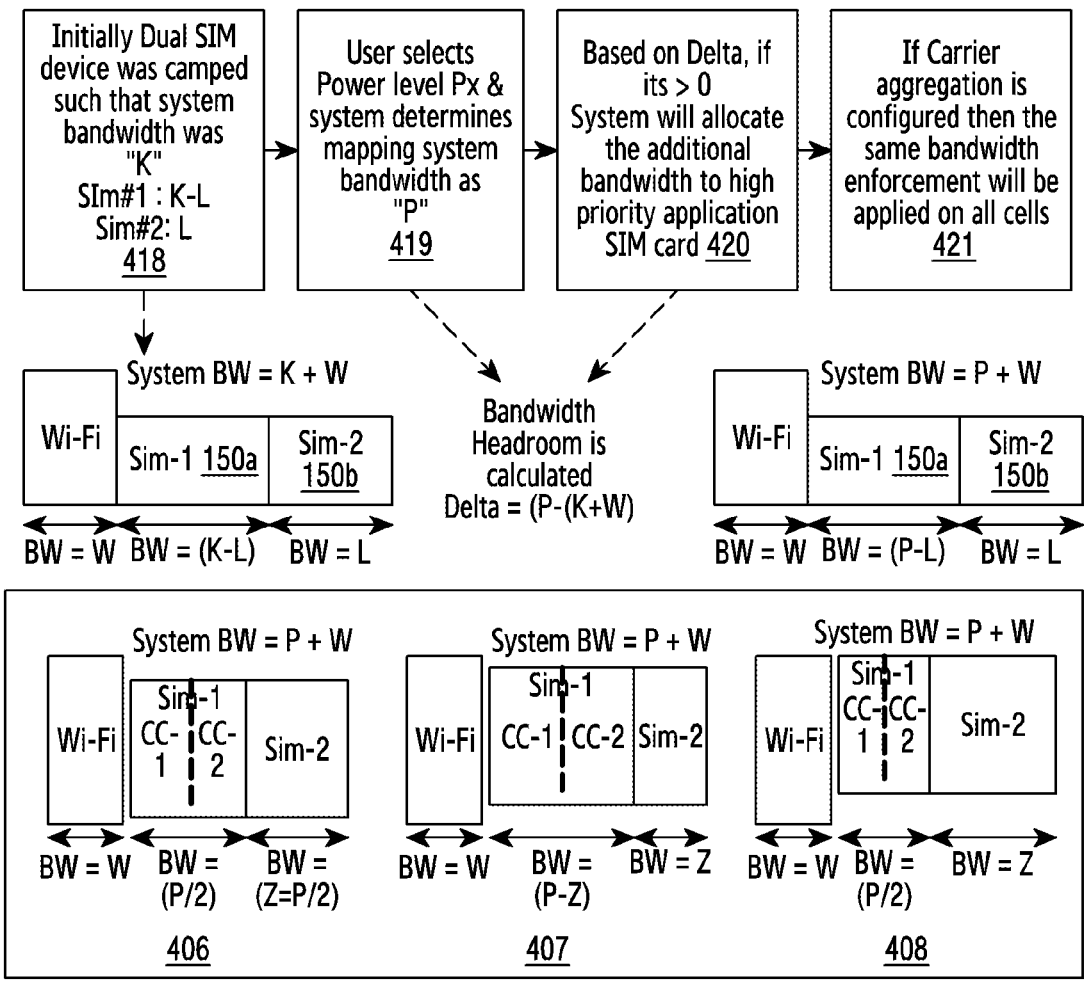

FIGS. 4A, 4B and 4C are diagrams illustrating example use cases for the BH calculation of various hardware capabilities and distributing the portion of the system bandwidth across the plurality of RATs based on the BH calculation and application priority, according to various embodiments.

In an embodiment, the power optimizer (170) calculates the available system bandwidth based on the user selects the appropriate power level on a scale of the power consumption level and current RAT available in the electronic device (100). Then, the power optimizer (170) distributes the available system bandwidth among available SIM (150)/stacks based on the application priority. The power optimizer (170) calculates the BH based on currently available system bandwidth and the power optimizer (170) identified that if "BH">0 then the SIM (150) which has high priority service is allocated the delta by the cell reselection to the higher bandwidth cell so that within permissible bandwidth good service can be provided to the user of the electronic device (100). The available delta bandwidth can also be used to enable carrier aggregation on specific bandwidth cells and this concept can be used in 4G and 5G/ENDC. Here, the power optimizer (170) controlling can be done by not sending Measurement Report (MR) of the cells whose bandwidth is more than the calculated delta. The same be applicable in a reverse way if "BH"<0 e.g., moving the SIM (150) to the lower bandwidth cells.

Referring to FIG. 4A: at 401, illustrates that the power optimizer (170) detects that the electronic device (100) has a single RF Dual SIM hardware capability. Both SIMs (150a, 150b) function independently and can latch on the same or different cells depending on which SIM (150a, 150b) is placed. Data can be enabled on one of the SIM (150a or 150b) in the electronic device (100), and the electronic device (100) can also be 5G capable. In LTE, CA may be enabled on the SIM (150) that has data-enabled, and ENDC configuration can be enabled as well. Another option is to link 5G to a data-enabled SIM, where a 5G CA may be set up.

At 402, the power optimizer (170) detects the RAT bandwidth of each RAT of the plurality of RATs available in the electronic device (100). For example, the bandwidth for the SIM-1 (150a) is "K-L," whereas the bandwidth for the SIM-2 (150b) is "L". Then, the power optimizer (170) determines the system bandwidth by combining the RAT bandwidth of each of RAT of the plurality of RATs available in the electronic device (100). The system bandwidth, for example, is "(K-L)+L=K". At 403-404, the power optimizer (170) detects the user-selected power level as "Px" and maps the selected power level to bandwidth "P". Furthermore, the power optimizer (170) calculates the BH/delta bandwidth, for example, is "P-K". Furthermore, the power optimizer (170) determines whether the BH/delta bandwidth is greater than zero then the power optimizer (170) allocates the delta bandwidth to the SIM (150) which has high priority service by cell reselection to the higher bandwidth cell in response to determining that the BH/delta bandwidth is greater than zero. At 405, the power optimizer (170) configures the carrier aggregation then the same bandwidth enforcement will be applied on all cells. For example, the bandwidth for the SIM-1 (150a) is "P-L," whereas the bandwidth for the SIM-2 (150b) is "L." The system bandwidth, for example, is "(P-L)+L=P."

In an embodiment, CC-1 and CC-2 are carrier components for carrier aggregation, numbers of these can be more than two also depends upon the electronic device (100) and network configuration, but the max limit of all the carrier components is limited by (P-Z). There can be a cell of different Bandwidth but overall Bandwidth will be capped which gives control to the power consumption based on the user-selected power mode. As Intra band, CA consumes less power than inter-band CA. So depending upon the power saving level/power mode user equipment (UE) (e.g., electronic device (100)) configuration will be changed dynamically by a CA controller module.

At 406, for example, a scenario where the bandwidth is evenly distributed between both the SIM (150a and 150b). At 407, for example, a scenario where the SIM-1 (150a) has high priority application thus given more bandwidth, here it can be seen that the CC-2 has more bandwidth in comparison to the CC-1. The enforcement can be done by reselection of the SIM-2 (150b) to the lower bandwidth cell in an idle state or by sending MR for the lower bandwidth cell if some kind of database is existing at the electronic device (100) side. At 408, for example, a scenario where the SIM-2 (150b) has the high priority application thus given more bandwidth.

Referring to FIG. 4B: at 409, illustrates that the power optimizer (170) detects that the electronic device (100) has a Dual RF Dual SIM hardware capability, "as always ON" requirement. Both SIMs (150a, 150b) function independently and can latch on the same or different cells depending on which SIM (150a, 150b) is placed. Data can be enabled on both of the SIM (150a and 150b) in the electronic device (100), and the electronic device (100) can also be 5G capable. In LTE, CA may be enabled on the SIM (150) that has data-enabled, and ENDC configuration can be enabled as well. Another option is to link 5G to a data-enabled SIM, where a 5G CA may be set up.

At 410, the power optimizer (170) detects the RAT bandwidth of each RAT of the plurality of RATs available in the electronic device (100). For example, the bandwidth for the SIM-1 (150a) is "K-L," whereas the bandwidth for the SIM-2 (150b) is "L". Then, the power optimizer (170) determines the system bandwidth by combining the RAT bandwidth of each of RAT of the plurality of RATs available in the electronic device (100). The system bandwidth, for example, is "(K–L)+L=K". At 411-412, the power optimizer (170) detects the user-selected power level as "Px" and maps the selected power level to bandwidth "P". Furthermore, the power optimizer (170) calculates the BH/delta bandwidth, for example, is "P–K". Furthermore, the power optimizer (170) determines whether the BH/delta bandwidth is greater than zero then the power optimizer (170) allocates the delta bandwidth to the SIM (150) which has high priority service by cell reselection to the higher bandwidth cell in response to determining that the BH/delta bandwidth is greater than zero. At 413, the power optimizer (170) configures the carrier aggregation then the same bandwidth enforcement will be applied on all cells. For example, the bandwidth for the SIM-1 (150a) is "P–L," whereas the bandwidth for the SIM-2 (150b) is "L." The system bandwidth, for example, is "(P–L)+L=P."

In an embodiment, both of the SIMs (150a and 150b) having maximum capped bandwidth is X. Accordingly the maximum bandwidth for each SIM (150) will be decided at run time based on the bandwidth occupied by other SIM (150). An additional module can be added which will give priority w.r.t. to provide more bandwidth to the SIM (150) on which any application is running which need more data and mapped to a particular SIM (150) based on an IP address and decide the distribution of Z and Z'

At 414, for example, a scenario where the bandwidth is evenly distributed between both the SIMs (150a and 150b). At 415, for example, a scenario where the SIM-1 (150a) has high priority application thus given more bandwidth, here it can be seen that the CC-2 has more bandwidth in comparison to the CC-1. The enforcement can be done by reselection of the SIM-2 (150b) to the lower bandwidth cell in an idle state or by sending MR for the lower bandwidth cell if some kind of database is existing at the electronic device (100) side. At 416, for example, a scenario where the SIM-2 (150b) has the high priority application thus given more bandwidth.

Referring to FIG. 4C: at 417, illustrates that the power optimizer (170) detects that the electronic device (100) has a 5G SA mode hardware capability. The electronic device (100) registered seamlessly to Wi-Fi and Radio networks. The electronic device (100) can move seamlessly, here due to extra interface on Wi-Fi along with NR System bandwidth (e.g., Wi-Fi+NR) and LTE) will increase which may consume more power differently in comparison to only radio connectivity configuration.

At 418, the power optimizer (170) detects the RAT bandwidth of each RAT of the plurality of RATs available in the electronic device (100). For example, the bandwidth for the SIM-1 (150a) is "K–L," whereas the bandwidth for the SIM-2 (150b) is "L" and the bandwidth for the Wi-Fi is "W". Then, the power optimizer (170) determines the system bandwidth by combining the RAT bandwidth of each of RAT of the plurality of RATs available in the electronic device (100). The system bandwidth, for example, is "(K–L)+L+W=K+W". At 419-420, the power optimizer (170) detects the user-selected power level as "Px" and maps the selected power level to bandwidth "P". Furthermore, the power optimizer (170) calculates the BH/delta bandwidth, for example, is "P–(K+W)". Furthermore, the power optimizer (170) determines whether the BH/delta bandwidth is greater than zero then the power optimizer (170) allocates the delta bandwidth to the SIM (150) which has high priority service by cell reselection to the higher bandwidth cell in response to determining that the BH/delta bandwidth is greater than zero. At 421, the power optimizer (170) configures the carrier aggregation then the same bandwidth enforcement will be applied on all cells. For example, the bandwidth for the SIM-1 (150a) is "P1–L," whereas the bandwidth for the SIM-2 (150b) is "L", and the bandwidth for the Wi-Fi is "W". The system bandwidth, for example, is "(P–L)+L+W=P+W".

In an embodiment, both of the SIMs (150a and 150b) having maximum capped bandwidth is X. Accordingly the maximum bandwidth for each SIM (150) will be decided at run time based on the bandwidth occupied by other SIM (150). Additional module can be added which will give priority w.r.t. to provide more bandwidth to the SIM (150) on which any application is running which need more data and mapped to a particular SIM (150) based on an IP address and decide the distribution of Z and Z'

At 422, for example, a scenario where the bandwidth is evenly distributed between both the SIMs (150a and 150b). At 423, for example, a scenario where the SIM-1 (150a) has high priority application thus given more bandwidth, here it can be seen that the CC-2 has more bandwidth in comparison to the CC-1. The enforcement can be done by reselection of the SIM-2 (150b) to the lower bandwidth cell in an idle state or by sending MR for the lower bandwidth cell if some kind of database is existing at the electronic device (100) side. At 424, for example, a scenario where the SIM-2 (150b) has the high priority application thus given more bandwidth.

Now consider an example scenario in which: W=50 MHz (Wi-Fi), K=250 Mz, L=150 MHz, Cell-1 for 5G: 100 MHz and Cell-2 for 5G: 150 MHz. Let's assume the different power level: P1=15 W mapped to 300 MHz (remaining time: 1 hour), P2=10 W mapped to 200 MHz (remaining time: 2 hours), and P3=5 W mapped to 100 MHz (remaining time: 3 hours). If the user selects P2, then P will be 200 and Delta will be 100 because P–(K+W)=200–(250+50)=–100. As Delta is negative may refer, for example, to the power optimizer (170) needing to move the system bandwidth to a lower value, to reduce the system bandwidth by 100 MHz. The power optimizer (170) allocates available system bandwidth among all the multi SIM (150) and access technology/RAT. For example, allocation-1 such as W=50 MHz (Wi-Fi), Cell-1 100 MHz, Cell-2 50 MHz. The allocation-2 such as W=50 MHz (Wi-Fi), Cell-1 125 MHz, Cell-2 25 MHz. The allocation-3 such as W=25 MHz (Wi-Fi), Cell-1 150 MHz, Cell-2 25 MHz. Consider an example where Delta is positive then the power optimizer (170) need to move the system bandwidth to a higher value, when the user wants to use some sub-function of the application which needs more system bandwidth then Delta will be positive.

In an embodiment, power mode, P1, P2 and P3, the user can restrict the overall bandwidth of the system e.g., SIM-1 (150a) and SIM-2 (150b) combined will camped on cell with total bandwidth mentioned by the user which will in turn save the power as based on prior art less bandwidth uses cause low power. Due to mobility the cell camped may change thus the electronic device (100) behavior varies based on that. For example, SIM-1 (150a) camped on 15 MHz cell and SIM-2 (150b) camped on 15 MHz cell and the user has restricted the system bandwidth 40 MHz in power mode P2. Then Carrier Aggregation (CA) on SIM-1 (150a) can have total bandwidth of all the cell=(40–15–15)=10 MHz. Here there is no restriction if SIM-1 (150a) has 2CA e.g., 15 MHz+10 MHz or 3CA e.g., 15 MHz+5 MHz+5 MHz. Also if SIM-2 (150b) moved to 5 MHz as then there is other combinations are possible for SIM-1 (150a) with capacity of 35 MHz bandwidth availability for the CA.

Figure 5A:
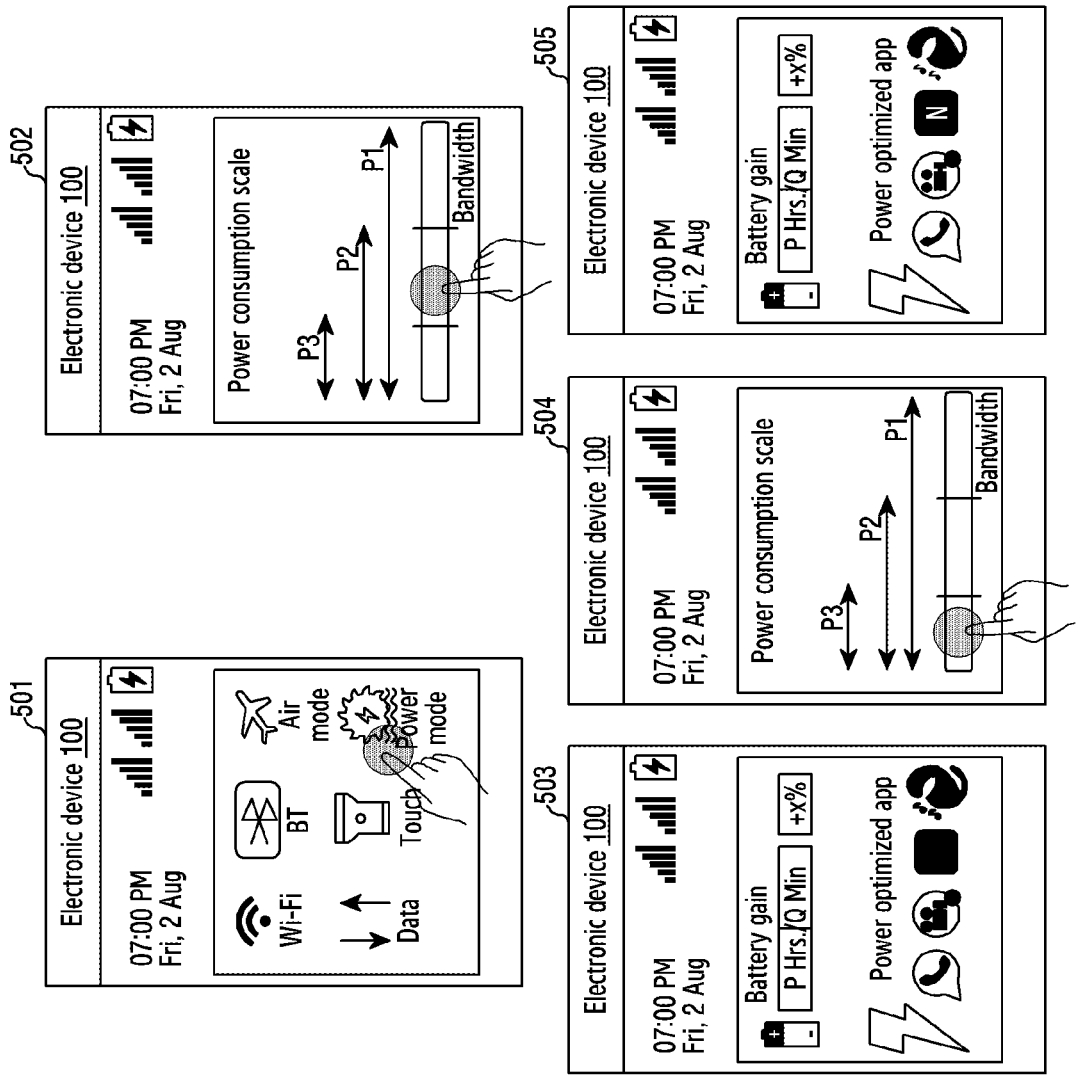
FIGS. 5A, 5B and 5C include diagrams illustrating example scenarios for enabling an application using the distributed system bandwidth across the plurality of RATs of the electronic device to optimize power consumption in the electronic device, according to various embodiments.
Figure 5B:
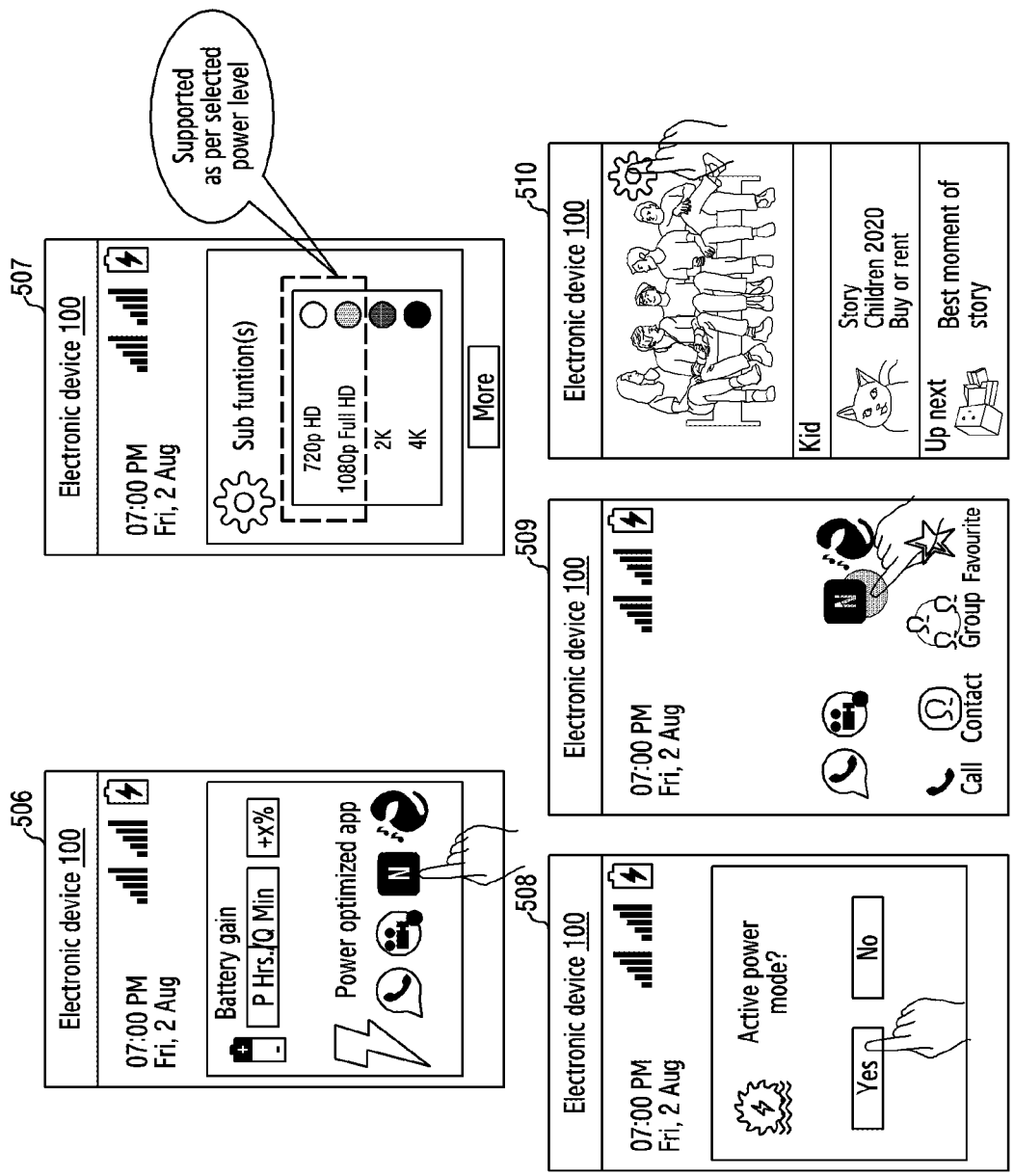
Figure 5C:
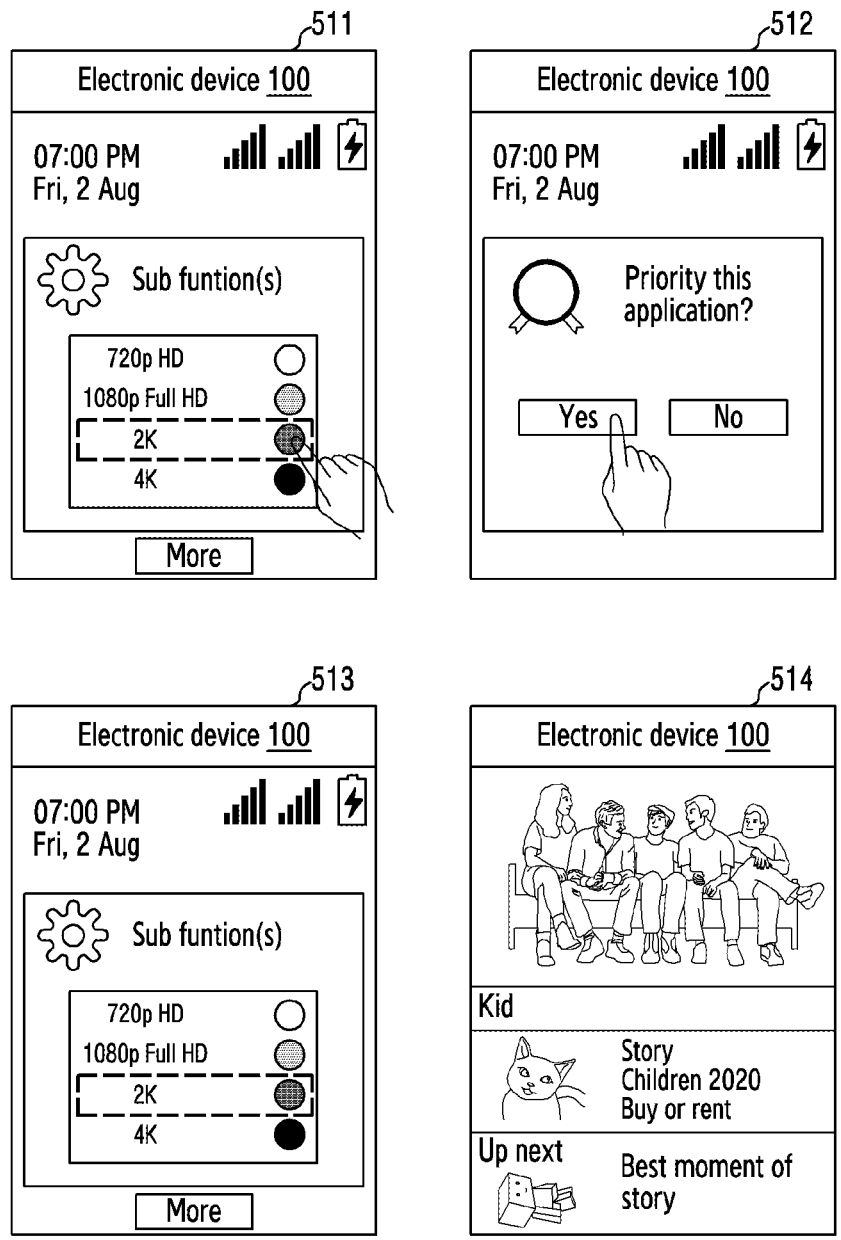

FIGS. 5A, 5B and 5C include diagrams illustrating an example scenario for enabling the application using the distributed system bandwidth across the plurality of RATs of the electronic device (100) to optimize power consumption in the electronic device (100), according to various embodiments.

At 501, the power optimizer (170) detects that the power-mode is enabled by the user of the electronic device (100). Then, the power optimizer (170) determines the system bandwidth of the plurality of RATs available in the electronic device (100). At 502, the power optimizer (170) displays the system bandwidth and the set of power consumption levels (e.g. P1, P2, P3) on a screen of the electronic device (100). Furthermore, the power optimizer (170) receives the user input performed on the displayed system bandwidth and the set of power consumption levels to select the manual-power consumption level (e.g. P2) of the set of power consumption levels, the P2 has a lower and upper range which can be continuous or discrete. Furthermore, the power optimizer (170) maps the portion of the system bandwidth to the power consumption level (e.g. P2) based on the user input. Furthermore, the power optimizer (170) displays the preview of the system bandwidth and the manual-power consumption level (e.g. P2) of the set of power consumption levels on the screen of the electronic device (100) and displays a power consumption scale on which the user can hover.

At 503, the power optimizer (170) displays the application sub-functions state and displays a current additional battery gain in percentage and hours and power-optimized application on the screen of the electronic device (100) based on the manual-power consumption level (e.g. P2). At 504, the user wants to gain battery life more than the current additional battery gain, the power optimizer (170) receives the user input performed on the displayed system bandwidth and the set of power consumption levels to select the manual-power consumption level (e.g. P3) of the set of power consumption levels. At 505, the power optimizer (170) displays the application sub-functions state and displays a current additional battery gain in percentage and hours and power-optimized application on the screen of the electronic device (100) based on the manual-power consumption level (e.g. P3).

At 506, the user clicks on one of power-optimized application (e.g. N-application), then the power optimizer (170) displays sub-functions of the N-application which are optimized for dynamic power optimization. At 507, the power optimizer (170) displays the sub-functions which can be enabled by virtue of available system bandwidth and power saving (e.g. P3). Light-gray buttons (e.g. 720p HD, 1080p Full HD) indicates that the user can directly use under a current settings (e.g. P3) but dark-gray buttons (e.g. 2K, 4K) indicates that the user needs to prioritize the N-application/SIM (150).

At 508, the power optimizer (170) displays a POP UP to activate the selected power mode (e.g. P3). Furthermore, the power optimizer (170) receives input from the user of the electronic device (100) and activates the selected power mode (e.g. P3) in the electronic device (100). At 509-510, the user of the electronic device (100) opens the N-application and watches a video on the N-application. At 511, in a normal state, all the Sub-functions state shown based on available bandwidth for that particular SIM (150). The light-gray buttons indicates that the user can directly use under the current settings but the dark-gray buttons (e.g. 2K) indicates the user needs to prioritize the N-application/SIM (150). The user can then prioritize the N-application/SIM (150) and by clicking on the dark-gray button (e.g. 2K).

At 512, the power optimizer (170) displays a POP UP to prioritize the N-application/SIM (150). Furthermore, the power optimizer (170) receives input from the user of the electronic device (100) and activates prioritize the N-application/SIM (150) in the electronic device (100). At 513, the power optimizer (170) distributes the system bandwidth and more bandwidth is available icon will turn into the light-gray button. At 514, the user can enjoy watching the N-application in selected resolution whereas same system bandwidth and current is consumed which was configured initially by the user.

Figure 6:
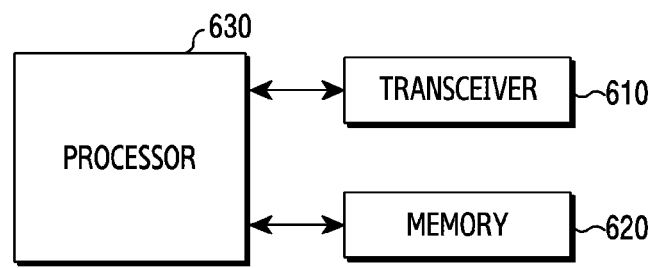
FIG. 6 is a block diagram illustrating an example configuration of a UE according to various embodiments.

FIG. 6 is a block diagram illustrating an example configuration of a UE according to various embodiments. FIG. 6 corresponds to the example of the electronic device of FIG. 2.

As shown in FIG. 6, the UE according to an embodiment may include a transceiver 610, a memory 620, and a processor (e.g., including processing circuitry) 630. The transceiver 610, the memory 620, and the processor 630 of the UE may operate according to a communication method of the UE described above. However, the components of the UE are not limited thereto. For example, the UE may include more or fewer components than those described above. In addition, the processor 630, the transceiver 610, and the memory 620 may be implemented as a single chip. Also, the processor 630 may include at least one processor.

The transceiver 610 collectively refers to a UE receiver and a UE transmitter, and may transmit/receive a signal to/from a base station or a network entity. The signal transmitted or received to or from the base station or a network entity may include control information and data. The transceiver 610 may include a RF transmitter for up-converting and amplifying a frequency of a transmitted signal, and a RF receiver for amplifying low-noise and down-converting a frequency of a received signal. However, this is only an example of the transceiver 610 and components of the transceiver 610 are not limited to the RF transmitter and the RF receiver.

The transceiver 610 may receive and output, to the processor 630, a signal through a wireless channel, and transmit a signal output from the processor 630 through the wireless channel.

The memory 620 may store a program and data required for operations of the UE. Also, the memory 620 may store control information or data included in a signal obtained by the UE. The memory 620 may be a storage medium, such as read-only memory (ROM), random access memory (RAM), a hard disk, a CD-ROM, and a DVD, or a combination of storage media.

The processor 630 may include various processing circuitry and control a series of processes such that the UE operates as described above. For example, the transceiver 610 may receive a data signal including a control signal transmitted by the base station or the network entity, and the processor 630 may determine a result of receiving the control signal and the data signal transmitted by the base station or the network entity.

Figure 7:
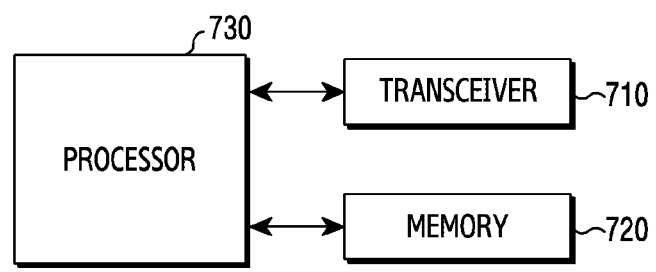
FIG. 7 is a block diagram illustrating an example configuration of a base station (BS) according to various embodiments.

FIG. 7 is a block diagram illustrating an example configuration of a base station (BS) according to various embodiments. FIG. 7 may correspond to the RAT of the present disclosure.

As shown in FIG. 7, the base station according to an embodiment may include a transceiver 710, a memory 720, and a processor 730. The transceiver 710, the memory 720, and the processor 730 of the base station may operate according to a communication method of the base station described above. However, the components of the base station are not limited thereto. For example, the base station may include more or fewer components than those described above. In addition, the processor 730, the transceiver 710, and the memory 720 may be implemented as a single chip. Also, the processor 730 may include at least one processor.

The transceiver 710 collectively refers to a base station receiver and a base station transmitter, and may transmit/receive a signal to/from a terminal or a network entity. The signal transmitted or received to or from the terminal or a network entity may include control information and data. The transceiver 710 may include a RF transmitter for up-converting and amplifying a frequency of a transmitted signal, and a RF receiver for amplifying low-noise and down-converting a frequency of a received signal. However, this is only an example of the transceiver 710 and components of the transceiver 710 are not limited to the RF transmitter and the RF receiver.

The transceiver 710 may receive and output, to the processor 730, a signal through a wireless channel, and transmit a signal output from the processor 730 through the wireless channel.

The memory 720 may store a program and data required for operations of the base station. Also, the memory 720 may store control information or data included in a signal obtained by the base station. The memory 720 may be a storage medium, such as read-only memory (ROM), random access memory (RAM), a hard disk, a CD-ROM, and a DVD, or a combination of storage media.

The processor 730 may include various processing circuitry and control a series of processes such that the base station operates as described above. For example, the transceiver 710 may receive a data signal including a control signal transmitted by the terminal, and the processor 730 may determine a result of receiving the control signal and the data signal transmitted by the terminal.

The embodiments disclosed herein can be implemented using at least one hardware device and performing network management functions to control the elements.

According to various embodiments, a method for optimizing power consumption in an electronic device comprising a plurality of Radio Access Technologies (RATs), the method comprising: determining, by the electronic device, a system bandwidth of the plurality of RATs available in the electronic device; mapping, by the electronic device, at least one portion of the system bandwidth to at least one power consumption level of a set of power consumption levels of the electronic device; distributing, by the electronic device, the at least one portion of the system bandwidth across the plurality of RATs based on the at least one mapped power consumption level of the set of power consumption levels of the electronic device; enforcing, by the electronic device, the distributed system bandwidth across the plurality of RATs in the electronic device; and enabling, by the electronic device, at least one application configured to use the distributed system bandwidth across the plurality of RATs in the electronic device.

In one embodiment, wherein determining, by the electronic device, the system bandwidth of the plurality of RATs available in the electronic device comprises: determining, by the electronic device, a hardware capability of the electronic device, wherein the hardware capability comprises the plurality of RATs available in the electronic device; detecting, by the electronic device, a RAT bandwidth of each RAT of the plurality of RATs available in the electronic device; and determining, by the electronic device, the system bandwidth by combining the RAT bandwidth of each of RAT of the plurality of RATs available in the electronic device.

In one embodiment, wherein the method comprises: normalizing, by the electronic device, the system bandwidth by determining a plurality of coefficients for each RAT of the plurality of RATs available in the electronic device; and calibrating, by the electronic device, the normalized system bandwidth with the set of power consumption levels of the electronic device.

In one embodiment, wherein the plurality of coefficients are calculated by at least one of: determining, by the electronic device, historical information of bandwidth used in particular RAT and power consumed during that time; applying, by the electronic device, a Machine Learning (ML) model on the historical information of bandwidth used in a particular RAT; and determining, by the electronic device, a ratio of the combined RAT bandwidth and difference between a maximum bandwidth and a minimum bandwidth of the combined RAT bandwidth.

In one embodiment, wherein mapping, by the electronic device, the at least one portion of the system bandwidth to the at least one power consumption level of the set of power consumption levels of the electronic device comprises: displaying, by the electronic device, the system bandwidth and the set of power consumption levels on a screen of the electronic device; receiving, by the electronic device, an input performed on the displayed system bandwidth and the set of power consumption levels to select a manual-power consumption level of the set of power consumption levels; and mapping, by the electronic device, the at least one portion of the system bandwidth to the at least one power consumption level based on the input.

In one embodiment, wherein displaying, by the electronic device, the system bandwidth and the set of power consumption levels on the screen of the electronic device comprises: detecting, by the electronic device, that a power-mode is enabled; determining, by the electronic device, at least one user profile; automatically selecting, by the electronic device, a power consumption level of the set of power consumption levels based on the at least one user profile; and displaying, by the electronic device, a preview of the system bandwidth and the automatically selected power consumption level of the set of power consumption levels based on the at least one user profile on the screen of the electronic device, wherein the preview is displayed before the selection of the at least one power consumption level of the set of power consumption levels of the electronic device.

In one embodiment, wherein the at least one user profile is determined by: identifying, by the electronic device, at least one application operating on the electronic device using at least one RAT of the plurality of RATs available in the electronic device; determining, by the electronic device, current time and current location associated with the electronic device while operating the at least one application; and generating, by the electronic device, the at least one user profile based on the at least one identified application, the determined current time, and the determined current location.

In one embodiment, wherein receiving, by the electronic device, an input performed on the displayed system bandwidth and the set of power consumption levels to select the manual-power consumption level of the set of power consumption levels comprises: determining, by the electronic device, whether the automatically selected power consumption level of the set of power consumption levels based on the at least one user profile is preferable; and performing, by the electronic device, one of: storing the automatically selected power consumption level of the set of power consumption levels based on the at least one user profile in response to determining that the automatically selected power consumption level of the set of power consumption levels based on the at least one user profile is preferable; and receiving the input on the displayed system bandwidth and the set of power consumption levels to select the manual-power consumption level in response to determining that the automatically selected power consumption level of the set of power consumption levels based on the at least one user profile is not preferable, and storing the manual-power consumption level.

In one embodiment, wherein each power consumption level comprises a unique preview template to display on the screen of the electronic device.

In one embodiment, wherein distributing, by the electronic device, the at least one portion of the system bandwidth across the plurality of RATs based on the at least one mapped power consumption level of the set of power consumption levels of the electronic device comprises: detecting, by the electronic device, an optimal power consumption level from one of the automatically selected power consumption level based on the at least one user profile and the manual-power consumption level based on the input; activating, by the electronic device, the power-mode by the user of the electronic device for the optimal power consumption level; determining, by the electronic device, a plurality of policy-parameters; and determining, by the electronic device, available system bandwidth to be distributed to each Subscriber Identity Module (SIM) slot, each RAT, and function-sub-function of the at least one application operating on the electronic device based on the plurality of policy parameters.

In one embodiment, wherein the plurality of policy parameters comprises a number of SIMs available in the electronic device, the at least one RAT available in the electronic device, and at least one application operating on the electronic device using the RAT available in the electronic device.

In one embodiment, wherein enforcing, by the electronic device, the distributed system bandwidth across the plurality of RATs comprises: distributing, by the electronic device, the available system bandwidth to each SIM, each RAT, and the function-sub-function of the at least one application operating on the electronic device based on the plurality of policy parameters; identifying, by the electronic device, a new requirement associated with the function-sub function of the at least one application, wherein the new requirement indicates that the function-sub function of the at least one application needs a higher system bandwidth than the distributed bandwidth of the function-sub function; re-mapping, by the electronic device, the at least one portion of the system bandwidth to at least one power consumption level of the set of power consumption levels of the electronic device for the new requirement; and re-distributing, by the electronic device, the available system bandwidth to each SIM, and each RAT, function-sub function of the at least one application operating on the electronic device (100) based on the new requirement.

In one embodiment, wherein the method further comprises: calculating, by the electronic device, Bandwidth Headroom (BH) based on the system bandwidth and at least one detected power consumption level; determining, by the electronic device, whether the BH is greater than zero; and performing, by the electronic device, at least one of: allocating a delta bandwidth to at least one SIM which has high priority service by cell reselection to higher bandwidth cell in response to determining that the BH is greater than zero, wherein the delta bandwidth enables carrier aggregation; and moving the at least one SIM to a lower bandwidth cell in response to determining that the BH is less than zero.

In one embodiment, wherein enabling, by the electronic device, at least one application to use the distributed system bandwidth across the plurality of RATs in the electronic device comprises: performing, by the electronic device, at least one of: displaying the function and sub-function of the at least one application operating on the electronic device on the screen of the electronic device based on distributed bandwidth; and modifying the function and sub-function of the at least one application operating on the electronic device based on the new requirement and displaying the modified function and modified sub-function of the at least one application operating on the electronic device on the screen of the electronic device.

According to various embodiments, an electronic device configured to optimize power consumption in an electronic device comprising a plurality of Radio Access Technologies (RATs), the electronic device comprising: a memory; a processor; and a power optimizer, operably connected to the memory and the processor, configured to: determine a system bandwidth of the plurality of RATs available in the electronic device; map at least one portion of the system bandwidth to at least one power consumption level of a set of power consumption levels of the electronic device; distribute the at least one portion of the system bandwidth across the plurality of RATs based on the at least one mapped power consumption level of the set of power consumption levels of the electronic device; enforce the distributed system bandwidth across the plurality of RATs in the electronic device; and enable at least one application to use the distributed system bandwidth across the plurality of RATs in the electronic device.

In one embodiment, wherein, in order to determine the system bandwidth of the plurality of RATs available in the electronic device, the power optimizer is further configured to: determine a hardware capability of the electronic device, wherein the hardware capability comprises the plurality of RATs available in the electronic device; detect a RAT bandwidth of each RAT of the plurality of RATs available in the electronic device; determine the system bandwidth by combining the RAT bandwidth of each of RAT of the plurality of RATs available in the electronic device.

In one embodiment, wherein the electronic device is further configured to: normalize the system bandwidth by determining a plurality of coefficients for each RAT of the plurality of RATs available in the electronic device; and calibrate the normalized system bandwidth with the set of power consumption levels of the electronic device.

In one embodiment, wherein the plurality of coefficients are calculated by at least one of: determining historical information of bandwidth used in particular RAT and power consumed during that time; applying a Machine Learning (ML) model on the historical information of bandwidth used in particular RAT; and determining a ratio of the combined RAT bandwidth and difference between a maximum bandwidth and a minimum bandwidth of the combined RAT bandwidth.

In one embodiment, wherein, in order to map the at least one portion of the system bandwidth to the at least one power consumption level of the set of power consumption levels of the electronic device, the power optimizer is further configured to: display the system bandwidth and the set of power consumption levels on a screen of the electronic device; receive an input performed on the displayed system bandwidth and the set of power consumption levels to select a manual-power consumption level of the set of power consumption levels; and map the at least one portion of the system bandwidth to the at least one power consumption level based on the input.

In one embodiment, wherein, in order to display the system bandwidth and the set of power consumption levels on the screen of the electronic device, the power optimizer is further configured to: detect that a power-mode is enabled by the user of the electronic device; determine at least one user profile; automatically selecting a power consumption level of the set of power consumption levels based on the at least one user profile; and display a preview of the system bandwidth and the automatically selected power consumption level of the set of power consumption levels based on the at least one user profile on the screen of the electronic device, wherein the preview is displayed before the selection of the at least one power consumption level of the set of power consumption levels of the electronic device.

In one embodiment, wherein the at least one user profile is determined by: identifying at least one application operating on the electronic device using at least one RAT of the plurality of RATs available in the electronic device; determining current time and current location associated with the electronic device while operating the at least one application; and generating the at least one user profile based on the at least one identified application, the determined current time, and the determined current location.

In one embodiment, wherein, in order to receive an input performed on the displayed system bandwidth and the set of power consumption levels to select the manual-power consumption level of the set of power consumption levels, the power optimizer is further configured to: determine whether the automatically selected power consumption level of the set of power consumption levels based on the at least one user profile is preferable; and perform one of: storing the automatically selected power consumption level of the set of power consumption levels based on the at least one user profile in response to determining that the automatically selected power consumption level of the set of power consumption levels based on the at least one user profile is preferable; and receive the input on the displayed system bandwidth and the set of power consumption levels to select the manual-power consumption level in response to determining that the automatically selected power consumption level of the set of power consumption levels based on the at least one user profile is not preferable, and storing the manual-power consumption level.

In one embodiment, wherein each power consumption level comprises a unique preview template to display on the screen of the electronic device.

In one embodiment, wherein, in order to distribute the at least one portion of the system bandwidth across the plurality of RATs based on the at least one mapped power consumption level of the set of power consumption levels of the electronic device, the power optimizer is further configured to: detect an optimal power consumption level from one of the automatically selected power consumption level based on the at least one user profile and the manual-power consumption level based on the input; activate the power-mode by the electronic device for the optimal power consumption level; determine a plurality of policy-parameters; and determine available system bandwidth to be distributed to each Subscriber Identity Module (SIM), each RAT, and function-sub-function of the at least one application operating on the electronic device based on the plurality of policy parameters.

In one embodiment, wherein the plurality of policy parameters comprises a number of SIMs available in the electronic device, the at least one RAT available in the electronic device, and at least one application operating on the electronic device using the RAT available in the electronic device.

In one embodiment, wherein, in order to enforce, by the electronic device, the distributed system bandwidth across the plurality of RATs, the power optimizer is further configured to: distribute the available system bandwidth to each SIM, each RAT, and the function-sub-function of the at least one application operating on the electronic device based on the plurality of policy parameters; identify a new requirement associated with the function-sub function of the at least one application, wherein the new requirement indicates that the function-sub function of the at least one application needs a higher system bandwidth than the distributed bandwidth of the function-sub function; re-map the at least one portion of the system bandwidth to at least one power consumption level of the set of power consumption levels of the electronic device for the new requirement; and re-distribute the available system bandwidth to each SIM, and each RAT, function-sub function of the at least one application operating on the electronic device based on the new requirement.

In one embodiment, wherein the electronic device is further configured to: calculate Bandwidth Headroom (BH) based on the system bandwidth and at least one detected power consumption level; determine whether the BH is greater than zero; and perform at least one of: allocating a delta bandwidth to at least one SIM which has high priority service by cell reselection to higher bandwidth cell in response to determining that the BH is greater than zero, wherein the delta bandwidth enables carrier aggregation; and moving the at least one SIM to a lower bandwidth cell in response to determining that the BH is less than zero.

In one embodiment, wherein, in order to, enable at least one application to use the distributed system bandwidth across the plurality of RATs in the electronic device, the electronic device is further configured to: perform at least one of: displaying the function and sub-function of the at least one application operating on the electronic device on a screen of the electronic device based on distributed bandwidth; and modifying the function and sub-function of the at least one application operating on the electronic device based on the new requirement and displaying the modified function and modified sub-function of the at least one application operating on the electronic device on the screen of the electronic device.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:
1. A method performed by an electronic device communicating with a plurality of Radio Access Technologies (RATs), the method comprising;
   determining a system bandwidth of the plurality of RATs available in the electronic device;

normalizing the system bandwidth using a plurality of coefficients for each RAT of the plurality of RATs;

calibrating the normalized system bandwidth with a set of power consumption levels of the electronic device;

mapping at least one portion of the system bandwidth to at least one power consumption level of the set of power consumption levels of the electronic device;

distributing the mapped at least one portion of the system bandwidth across the plurality of RATs; and enabling at least one application to use the distributed at least one system bandwidth across the plurality of RATs in the electronic device.

2. The method of claim 1, further comprising:
determining a hardware capability of the electronic device;
detecting a RAT bandwidth of each RAT of the plurality of RATs; and
determining the system bandwidth by combining the RAT bandwidth of each of RAT of the plurality of RATs.

3. The method of claim 1, wherein the plurality of coefficients are calculated by at least one of:
determining historical information of bandwidth used in a RAT and a power consumed during that time;
applying a Machine Learning (ML) model on the historical information of bandwidth used in the RAT; or
determining a ratio of a combined RAT bandwidth and difference between a maximum bandwidth and a minimum bandwidth of the combined RAT bandwidth.

4. The method of claim 1, further comprising:
displaying the system bandwidth and the set of power consumption levels on a screen of the electronic device; and
receiving an input performed on the displayed system bandwidth and the set of power consumption levels to select a manual-power consumption level of the set of power consumption levels.

5. The method of claim 4, further comprising:
detecting that a power-mode is enabled;
determining at least one user profile;
selecting a power consumption level of the set of power consumption levels based on the at least one user profile; and
displaying a preview of the system bandwidth and the selected power consumption level of the set of power consumption levels based on the at least one user profile on the screen of the electronic device, wherein the preview is displayed before the selection of the at least one power consumption level of the set of power consumption levels of the electronic device.

6. The method of claim 5, wherein the at least one user profile is determined by:
identifying at least one application operating on the electronic device using at least one RAT of the plurality of RATs available in the electronic device;
determining a current time and a current location associated with the electronic device while operating the at least one application; and
generating the at least one user profile based on the at least one identified application, the determined current time, and the determined current location.

7. The method of claim 5, further comprising:
detecting an optimal power consumption level from one of the selected power consumption level based on the at least one user profile and the manual-power consumption level based on the input;

activating the power-mode for an optimal power consumption level;
determining a plurality of policy-parameters; and
determining an available system bandwidth to be distributed to each Subscriber Identity Module (SIM) slot, each RAT, and function-sub-function of the at least one application operating on the electronic device based on the plurality of policy parameters.

8. The method of claim 7, wherein the plurality of policy parameters comprises a number of SIMs available in the electronic device, the at least one RAT available in the electronic device, and at least one application operating on the electronic device using the RAT available in the electronic device.

9. The method of claim 7, further comprising:
distributing the available system bandwidth to each SIM, each RAT, and the function-sub-function of the at least one application operating on the electronic device based on the plurality of policy parameters;
identifying a new requirement associated with the function-sub-function of the at least one application, wherein the new requirement indicates that the function-sub-function of the at least one application needs a higher system bandwidth than the distributed bandwidth of the function-sub-function;
re-mapping the at least one portion of the system bandwidth to at least one power consumption level of the set of power consumption levels of the electronic device for the new requirement; and
re-distributing the available system bandwidth to each SIM, and each RAT, function-sub function of the at least one application operating on the electronic device based on the new requirement.

10. The method of claim 9, further comprising:
performing at least one of:
displaying the function-sub-function of the at least one application operating on the electronic device on the screen of the electronic device based on the distributed at least one system bandwidth; and
modifying the function-sub-function of the at least one application operating on the electronic device based on the new requirement and displaying the modified function-sub-function of the at least one application operating on the electronic device on the screen of the electronic device.

11. The method of claim 4, further comprising:
determining whether the selected power consumption level of the set of power consumption levels based on the at least one user profile is preferable; and
performing one of:
storing the selected power consumption level of the set of power consumption levels based on the at least one user profile in response to determining that the automatically selected power consumption level of the set of power consumption levels based on the at least one user profile is preferable; and
receiving the input on the displayed system bandwidth and the set of power consumption levels to select the manual-power consumption level in response to determining that the selected power consumption level of the set of power consumption levels based on the at least one user profile is not preferable, and storing the manual-power consumption level.

12. The method of claim 11, wherein each power consumption level comprises a unique preview template to display on the screen of the electronic device.

13. The method of claim 1, further comprising:
calculating Bandwidth Headroom (BH) based on the system bandwidth and the at least one power consumption level;
determining whether the BH is greater than zero; and performing at least one of:
allocating a delta bandwidth to at least one SIM which has high priority service by cell reselection to higher bandwidth cell in response to determining that the BH is greater than zero, wherein the delta bandwidth enables carrier aggregation; and
moving the at least one SIM to a lower bandwidth cell in response to determining that the BH is less than zero.

14. An electronic device communicating with a plurality of Radio Access Technologies (RATs), the electronic device comprising:
a memory;
at least one processor comprising processor circuitry coupled to the memory, and configured individually and/or collectively to:
determine a system bandwidth of the plurality of RATs available in the electronic device;
normalize the system bandwidth using a plurality of coefficients for each RAT of the plurality of RATs;
calibrate the normalized system bandwidth with a set of power consumption levels of the electronic device;
map at least one portion of the system bandwidth to at least one power consumption level of the set of power consumption levels of the electronic device;
distribute the mapped at least one portion of the system bandwidth across the plurality of RATs; and
enable at least one application to use the distributed at least one system bandwidth across the plurality of RATs in the electronic device.

15. The electronic device of claim 14, wherein the at least one processor is further configured individually and/or collectively to:
determine a hardware capability of the electronic device;
detect a RAT bandwidth of each RAT of the plurality of RATs;
determine the system bandwidth by combining the RAT bandwidth of each of RAT of the plurality of RATs.

16. The electronic device of claim 14, wherein the plurality of coefficients are calculated by at least one of:
determining historical information of bandwidth used in a RAT and a power consumed during that time;
applying a Machine Learning (ML) model on the historical information of bandwidth used in the RAT; or
determining a ratio of a combined RAT bandwidth and difference between a maximum bandwidth and a minimum bandwidth of the combined RAT bandwidth.

17. The electronic device of claim 14, wherein the at least one processor is further configured individually and/or collectively to:
display the system bandwidth and the set of power consumption levels on a screen of the electronic device; and
receive an input performed on the displayed system bandwidth and the set of power consumption levels to select a manual-power consumption level of the set of power consumption levels.

18. The electronic device of claim 17, wherein the at least one processor is further configured individually and/or collectively to:
detect that a power-mode is enabled;
determine at least one user profile;
select a power consumption level of the set of power consumption levels based on the at least one user profile; and
display a preview of the system bandwidth and the automatically selected power consumption level of the set of power consumption levels based on the at least one user profile on the screen of the electronic device, wherein the preview is displayed before the selection of the at least one power consumption level of the set of power consumption levels of the electronic device.

* * * * *